US008125927B2

(12) United States Patent
Nandy et al.

(10) Patent No.: US 8,125,927 B2
(45) Date of Patent: Feb. 28, 2012

(54) METHOD AND SYSTEM FOR NETWORK TOPOLOGY DISCOVERY

(75) Inventors: Biswajit Nandy, Kanata (CA); Nabil Seddigh, Kanata (CA); Sabeel Ansari, Nepean (CA); Kevin Wong, Ottawa (CA); Rupinder Singh Makkar, Kanata (CA)

(73) Assignee: Solana Networks Inc., Ottawa, Ontario (CA)

( * ) Notice: Subject to any disclaimer, the term of this patent is extended or adjusted under 35 U.S.C. 154(b) by 233 days.

(21) Appl. No.: 12/487,086

(22) Filed: Jun. 18, 2009

(65) Prior Publication Data

US 2009/0316602 A1 Dec. 24, 2009

Related U.S. Application Data

(60) Provisional application No. 61/073,480, filed on Jun. 18, 2008.

(51) Int. Cl.
*H04L 12/28* (2006.01)

(52) U.S. Cl. ........................................... 370/254

(58) Field of Classification Search ................ None
See application file for complete search history.

(56) References Cited

U.S. PATENT DOCUMENTS

| | | | | |
|---|---|---|---|---|
| 5,684,796 A * | 11/1997 | Abidi et al. | ........... | 370/389 |
| 5,793,975 A * | 8/1998 | Zeldin | ........... | 709/224 |
| 6,061,334 A * | 5/2000 | Berlovitch et al. | ........... | 370/255 |
| 7,720,940 B1 * | 5/2010 | Wilsey et al. | ........... | 709/220 |
| 2003/0046390 A1 * | 3/2003 | Ball et al. | ........... | 709/224 |
| 2007/0180109 A1 * | 8/2007 | Brim | ........... | 709/225 |
| 2008/0031156 A1 * | 2/2008 | Balasubramaniam et al. | ........... | 370/254 |
| 2009/0028067 A1 * | 1/2009 | Keeni et al. | ........... | 370/254 |
| 2010/0020722 A1 * | 1/2010 | Farkas et al. | ........... | 370/254 |
| 2010/0278076 A1 * | 11/2010 | Reddy et al. | ........... | 370/254 |

OTHER PUBLICATIONS

Yuri Breitbart, Minos Garofalakis et al. "Topology Discovery in Heterogeneous IP Networks", published in the Proceedings of IEEE INFOCOM, 2000.
Yuri Breitbart, Minos Garofalakis et al."Topology Discovery in Heterogeneous IP Networks: The Net-Inventory System", published in IEEE/ACM Transactions on Networking, vol. 12, No. 3, Jun. 2004.
Bruce Lowekamp et al. "Topology Discovery for Large Ethernet Networks", published in the Proceedings of ACM SIGCOMM, San Diego, California, USA, Aug. 2001.
Yigal Bejerano et al. "Physical Topology Discovery for Large Multi-Subnet Networks", published in the Proceedings of INFOCOM'2003, San Francisco, USA, Apr. 2003.
Yigal Bejerano. "Taking the Skeletons Out of the Closets: A Simple and Efficient Topology Discovery Scheme for Large Ethernet LANs", published in the Proceeding of INFOCOM 2006, Barcelona, Spain, Apr. 2006.

(Continued)

*Primary Examiner* — Ayaz Sheikh
*Assistant Examiner* — Timothy J Weidner
(74) *Attorney, Agent, or Firm* — IP-MEX Inc.; Victoria Donnelly

(57) ABSTRACT

Methods and apparatus for topology discovery of a network having heterogeneous network devices are disclosed. A network appliance communicates with the network devices to acquire device descriptors and characterize the network devices accordingly. Topology discovery is based on device characteristics, media-access data, and encoded connectivity patterns, where each connectivity pattern is defined by devices of specific device types and respective media-access data. A topology deduction module of the network appliance synthesizes a network image starting with unconnected devices and progressively incorporating detected connectivity patterns.

20 Claims, 39 Drawing Sheets

OTHER PUBLICATIONS

David Stott. "Layer-2 Path Discovery Using Spanning Tree MIBs", Avaya Labs Research, Mar. 2002.
802.1AB™ IEEE Standard for Local and metropolitan area networks Station and Media Access Control Connectivity Discovery, 2005.
Case et al., RFC 1901, Introduction to Community-based SNMPv2, Jan. 1996.
Case et al., RFC 1157, A Simple Network Management Protocol (SNMP), May 1990.
Link Layer Discovery Protocol, Article in Wikipedia published at http://en.wikipedia.org/wiki/Link_Layer_Discovery_Protocol, published on Apr. 22, 2008.
OSI Model, Article in Wikipedia published at http://en.wikipedia.org/wiki/OSI_model, published on Jun. 10, 2008.
Data Link Layer, Article in Wikipedia published at http://en.wikipedia.org/wiki/Data_Link_Layer, published on Jun. 16, 2008.

\* cited by examiner

600
Set of descriptors

| Notation | Information sought |
|---|---|
| $D_0$ | Presence of SNMP agent |
| D1 | IP-forwarding capability |
| D2 | System services |
| D3 | IP address configuration |
| D4 | Host-resource MIB |
| D5 | Forwarding table entries |
| D6 | system description |

*FIG. 6*

| Index of characterization vector | Device descriptors | | | | | | Device Types (1330) | Index of Device Type |
|---|---|---|---|---|---|---|---|---|
| | D1 | D2 | D3 | D4 | D5 | D6 | | |
| 0 | 00 | 00 | x | x | x | x | | |
| 1 | 01 | xx | 1 | 1 | x | x | End device with SNMP agent | 1 |
| 2 | 10 | xx | x | 1 | x | x | | |
| 3 | 00 | 01 | x | x | x | x | | |
| 4 | 10 | xx | x | 0 | 1 | x | L2 Switch | 2 |
| 5 | 10 | xx | x | 0 | 0 | 1 | | |
| 6 | 00 | 11 | x | x | x | x | | |
| 7 | 01 | xx | 0 | x | x | x | L3 Switch | 3 |
| 8 | 00 | 10 | x | x | x | x | | |
| 9 | 01 | xx | 1 | 0 | x | x | Router | 4 |

1320(0) P*(0) → row 0
1320(5) P*(5) → row 5

| Index of characterization vector | Device descriptors ||||||| 1330 Device Types | Index of Device Type |
|---|---|---|---|---|---|---|---|---|
| | D1 | D2 | D3 | D4 | D5 | D6 | | |
| 0 | 00 | 00 | 0 | 0 | 0 | 0 | End device with SNMP agent | 1 |
| 1 | 01 | 00 | 1 | 1 | 0 | 0 | | |
| 2 | 10 | 00 | 0 | 1 | 0 | 0 | | |
| 3 | 00 | 01 | 0 | 0 | 1 | 0 | | |
| 4 | 10 | 00 | 0 | 0 | 1 | 0 | L2 Switch | 2 |
| 5 | 10 | 00 | 0 | 0 | 0 | 1 | | |
| 6 | 00 | 11 | 0 | 0 | 0 | 0 | L3 Switch | 3 |
| 7 | 01 | 00 | 0 | 0 | 0 | 0 | | |
| 8 | 00 | 10 | 1 | 0 | 0 | 0 | | |
| 9 | 01 | 00 | 1 | 0 | 0 | 0 | Router | 4 |

FIG. 14

| Index of characterization vector | Mask for descriptor vector Θ | | | | | | Device Types 1330 | Index of Device Type |
|---|---|---|---|---|---|---|---|---|
| | D1 | D2 | D3 | D4 | D5 | D6 | | |
| 0 | 11 | 11 | 0 | 0 | 0 | 0 | | |
| 1 | 11 | 00 | 1 | 1 | 0 | 0 | End device with SNMP agent | 1 |
| 2 | 11 | 00 | 0 | 1 | 0 | 0 | | |
| 3 | 11 | 11 | 0 | 0 | 0 | 0 | L2 Switch | 2 |
| 4 | 11 | 00 | 0 | 1 | 0 | 1 | | |
| 5 | 11 | 00 | 0 | 1 | 1 | 1 | | |
| 6 | 11 | 11 | 0 | 0 | 1 | 0 | L3 Switch | 3 |
| 7 | 11 | 00 | 1 | 0 | 0 | 0 | | |
| 8 | 11 | 11 | 0 | 0 | 0 | 0 | Router | 4 |
| 9 | 11 | 0 | 1 | 1 | 0 | 0 | | |

METHOD AND SYSTEM FOR NETWORK TOPOLOGY DISCOVERY

CROSS-REFERENCE TO RELATED APPLICATIONS

This application claims priority to U.S. provisional application 61/073,480, which was filed on Jun. 18, 2008, the content of which is incorporated herein by reference.

FIELD OF THE INVENTION

The present invention relates to network monitoring and analysis. In particular, the invention is directed to automated topology discovery of a local-area network such as an Ethernet.

BACKGROUND

Computer networks are dynamic systems that need to be adapted to accommodate temporal and spatial variation of traffic demand. The increasing versatility of network-elements motivates structural changes and the introduction of new services which, in turn, influence the volume and distribution of traffic.

An accurate record of a network's layout is of paramount importance in resolving service disruption as well as in planning network enhancement. The layout of a rapidly changing network is difficult to determine by manual means. As the number of nodes increases, the number of alternative inter-nodal connection patterns increases rendering network-design rather challenging. Detecting, diagnosing and correcting localized malfunctions also become more intricate as the number of interconnected nodes increases.

In addition to real-time control, there is a need for a comprehensive and efficient network design and provisioning system. Conventional network-planning systems are semi-automated, fragmented, and strenuous.

Previous attempts to develop automated network-topology discovery tools applicable to Ethernets may be classified into two categories. The first is based on Address Forwarding Table (AFT) and the second is based on Spanning Tree Protocol (STP).

In a paper entitled "Topology Discovery in Heterogeneous IP Networks", published in the Proceedings of IEEE INFO-COM'2000, Breitbart et al. propose a discovery technique based on necessary and sufficient condition of complementary relationships of addressing tables of two directly connected switches on specific ports. The technique applies to a network employing the "Simple Network Management Protocol (SNMP)", which is employed in network-management systems to monitor network devices to detect conditions that warrant administrative attention.

In an ideal scenario, with all forwarding tables complete and all SNMP-enabled devices, the technique generates layer-2 topology. In the case of address incompleteness, an empirical solution is proposed. The technique is not applicable to a network employing switches and hubs which do not implement the SNMP.

In a paper entitled "Topology Discovery in Heterogeneous IP Networks: The Net-Inventory System", published in IEEE/ACM Transactions on Networking, June 2004, Breitbart et al. extend the discovery technique to handle multiple subnets. However, no solution is provided for a case of AFT incompleteness.

In a paper entitled "Topology Discovery for Large Ethernet Networks", published in the Proceedings of ACM SIG-COMM, San Diego, Calif., August 2001, Lowekamp et al. propose mutual exclusion of complements of addressing tables as a criterion for determining the topology. However, the mutual exclusion condition does not hold true if multiple subnets are present and connections cannot be established between certain ports using the condition.

In a paper entitled "Physical Topology Discovery for Large Multi-Subnet Networks", published in the Proceedings of INFOCOM'2003, San Francisco, April 2003, Bejerano et al. present a technique applicable to a network comprising multiple subnets. The technique also adopts a principle of constraint-based elimination.

In a paper titled "Taking The Skeletons Out of the Closets: A Simple and Efficient Topology Discovery Scheme for Large Ethernet LANs", published in the Proceeding of INFO-COM 2006, Barcelona, Spain, April 2006, Bejerano presents a computationally efficient solution for Layer-2 topology discovery.

All the above works are based on forwarding tables in switches.

In a paper entitled "Layer-2 Path Discovery Using Spanning Tree MIBs", Avaya Labs Research, March 2002, Scott presents a technique based on spanning trees as formed by spanning tree algorithms to derive the layer-2 topology of a network. Essentially, a stabilized spanning tree itself completely represents connections between the switches. The technique applies to layer-2 networks employing the Spanning-Tree Protocol (STP). Unlike the forwarding table approach, the computational effort for determining the connectivity of switches is negligible. Many layer-2 networks, however, do not deploy the STP protocol or any of its variants.

Automated topology discovery of a layer-2 Ethernet network presents various technical challenges. These challenges are primarily due to (i) existence of hubs and unmanaged switches in a network, (ii) minimal deployment of standardized MAC connectivity discovery protocol such as IEEE 802.1ab and (iii) heterogeneity of layer-2 switches in a network.

There is a need, therefore, for an efficient method and system for network topology discovery which would be suitable for Ethernet network and avoid shortcomings of the prior art. Such a method need be adaptable for implementation in an automated network appliance for real-time network monitoring and analysis to expedite diagnostics and trouble-shooting and, hence, ensure service quality and continuity.

SUMMARY

The present invention provides a method of topology discovery of layer-2 networks based on address-forwarding tables (AFTs). The method applies to a heterogeneous network having nodes which may include switches, hubs, and end systems. The discovery method does not rely on vendor-specific protocols or data. The method of the embodiment of the invention scales gracefully to handle a network having a large number of nodes.

The method of layer-2 network-topology discovery comprises steps of discovery and classification of network devices, data collection from switches, intelligent data distillation, and joining network devices to build layer-2 topology. A virtual local-area network (VLAN) may then be mapped on the layer-2 topology. The step of data distillation allows elimination of spurious data which may be acquired in the steps of network-devices discovery and data collection.

In accordance with one aspect, the present invention provides a method for topology discovery of a network comprising a plurality of heterogeneous devices. The method is implemented at a network appliance communicatively coupled to the network and having a processor and memory storing processor-executable instructions. The method comprises steps of: acquiring a set of device descriptors each descriptor assigned a respective number of descriptor values; determining a root descriptor within the set of descriptors; selecting a current descriptor starting with the root descriptor; and communicating with each device of the plurality of heterogeneous devices to acquire a respective value of the current descriptor. Each descriptor value indicates a respective device type among a set of predefined device types or a successor descriptor within the set of descriptors.

If the value of a descriptor indicates an identifiable device type among the predefined device types, the identifiable device type is added to an inventory of identified devices. If the value of a descriptor indicates an identifiable successor descriptor within the set of descriptors, the identifiable successor descriptor becomes a current descriptor and the process is repeated until an identifiable device type is determined.

The method further comprises a step of acquiring media-access-control data from each device and determining connectivity of a subset of the heterogeneous devices using the inventory of identified devices and the media-access-control data. Data may be acquired from a device by sending queries defined in the standardized simple network management protocol (SNMP) and interpreting responses from devices according to rules of the SNMP.

In accordance with another aspect, the present invention provides a method for topology discovery of a network comprising a plurality of heterogeneous devices. The method is implemented at a network appliance communicatively coupled to the network and having a processor and memory storing processor-executable instructions. The method comprise a step of acquiring a set of descriptors, each descriptor assigned a respective number of descriptor values, each descriptor value indicating one of a respective device type and a successor descriptor among the set of descriptors. To acquire descriptors' values for a set of descriptors from a specific device, a set of messages are sent from the network appliance to the specific device which cause the specific device to send a description vector indicating descriptor values of the set of descriptors. The specific device is characterized according to the description vector. An identifier of the specific device and a respective device type are added to an inventory of identified devices.

The method further comprises a step of acquiring media-access-control data from each device and determining connectivity of a subset of the heterogeneous devices using the inventory of identified devices and the media-access-control data.

A set of characterization vectors is determined. Each characterization vector comprises values of selected descriptors, among the set of descriptors, relevant to one device type among the set of predefined device types so that each device type corresponds to at least one characterization vector. A device characterization table, indicating for each characterization vector a corresponding device type, is formed.

To characterize a specific device, a target characterization vector from the set of characterization vectors is selected and a process of establishing correspondence of the description vector to the target characterization vector is executed. If correspondence is ascertained, the specific device is determined to be a device type corresponding to the target characterization vector. Otherwise, another target characterization vector is selected. If the description vector does not correspond to any of the characterization vectors, the specific device is considered to be of indefinite type.

The process of establishing correspondence of the description vector to the target characterization vector comprises steps of: expressing each descriptor value as a binary number; setting a value of any descriptor other than the selected descriptors to zero; and constructing a specific mask for each characterization vector to produce a set of masks having a one-to-one correspondence to the set of characterization vectors. The specific mask comprises a sequence of bits. Each bit which corresponds to the selected descriptors is set to a value of "1" and each bit which corresponds to any descriptor other than the selected descriptors is set to a value of "0".

A target characterization vector from the set of characterization vectors is selected and a logical-AND operation of the set of descriptor values corresponding to the specific device and a mask corresponding to the target characterization vector is performed to produce a masked description vector. A logical EXCLUSIVE-OR of the masked description vector and a characterization vector produces a device-type indicator. If the device-type indicator has a value of zero, the specific device is characterized to be a device type corresponding to the target characterization vector.

In accordance with a further aspect, the present invention provides a method for topology discovery of a network comprising a plurality of heterogeneous devices. The method is implemented at a network appliance having a processor and memory storing processor-executable instructions. The method comprises steps of: acquiring a set of descriptors, each descriptor assigned a respective number of descriptor values, each descriptor value indicating one of a respective device type among a set of predefined device types and a successor descriptor among the set of descriptors; and identifying specific descriptor values of specific descriptors defining each device type of the predefined device types.

For each device type, indices corresponding to the specific descriptor values of specific descriptors and all values of descriptors other than the specific descriptors are determined. A lookup device-characterization array is constructed to indicate a device type corresponding to a description vector. A set of messages are sent to the heterogeneous devices, each message requesting a value of a specific descriptor. Description vectors are received at the network appliance, each description vector indicating descriptor values of a respective device. An index corresponding to each description vector is determined and a device type of the respective device, corresponding to the index, is read from the lookup device-characterization array.

The method further comprises steps of forming an inventory of identified devices for each of which a respective device type has been identified; acquiring address-forwarding tables from each of the identified devices; and determining connectivity of the identified devices using the inventory of identified devices and the address-forwarding tables.

The method further comprises steps of selecting a target switch among the plurality of heterogeneous devices; selecting a port in the target switch and acquiring an address forwarding table for the port. If the address forwarding table includes multiple entries, all corresponding to end devices among the plurality of heterogeneous devices, an unmanaged node connecting the end devices to the port is inserted in a synthesized image of the network.

The method further comprises steps of: identifying a first switch among the plurality of heterogeneous devices; identifying a second switch among the plurality of heterogeneous devices; and selecting a port pair, a first port from among ports of the first switch and a second port from among ports of the second switch.

The intersection of a first address-forwarding table of the first port and a second address-forwarding table of the second port is determined. If the two tables are non-intersecting and have a complete union, direct connectivity between the first switch and the second switch is ascertained. A complete union occupies an entire address space.

If the first address forwarding table and the second address forwarding table have a complete union and common end devices among the plurality of heterogeneous devices, an unmanaged node connecting the end devices to the port pair is inserted in a synthesized image of the network.

In accordance with a further aspect, the invention provides a method for topology discovery of a network comprising a plurality of heterogeneous devices. The method is implemented at a network appliance having a processor and memory storing processor-executable instructions. The method comprises steps of: acquiring device types, among a set of predefined device types, of a set of devices among the plurality of heterogeneous devices; acquiring media-access data from each device within the set of devices; and acquiring encoded connectivity patterns, each connectivity pattern defined by devices of specific device types and respective media-access data.

The encoded connectivity patterns are arranged into a set of ordered connectivity patterns according to topological dependency so that each ordered connectivity pattern is independent of any succeeding ordered connectivity pattern.

A process of network-image synthesis starts with unconnected devices of the set of devices. The ordered connectivity patterns are selected sequentially and presence of each selected connectivity pattern is exhaustively recognized. Each occurrence of a selected connectivity pattern is incorporated into the network image.

The method further comprises steps of: determining a subset of still unconnected devices among the set of devices; identifying subnets comprising interconnected subsets of the set of devices; and conjecturing connectivity of the unconnected devices to the subnets.

In accordance with a further aspect, the present invention provides a network appliance communicatively coupled to a network. The network comprises a plurality of devices, each device having at least one port. The network appliance comprises a processor, and a computer readable storage medium, e.g., a memory device, a DVD, a CD-ROM, storing processor-executable instructions. The processor-executable instructions are organized into modules.

A data acquisition and validation module collects data from the plurality of devices and validates received data to ensure correctness and completeness.

A device identification and classification module identifies active devices among the plurality of devices, produces a set of identified devices, and classifies each identified device according to device descriptors acquired from the set of identified devices.

A topology deduction module synthesizes a network-topology image according to: classifications of the set of identified devices; address-forwarding data acquired from each port of each device among the set of identified devices; and a set of encoded connectivity patterns, each connectivity pattern defined by devices of specific device types and respective media-access data.

The device identification and classification module comprises processor readable instructions which cause the processor to: communicate with devices having IP addresses within a specified IP address range; form a set of IP addresses of responsive devices; and communicate with each responsive device to obtain values of the device descriptors, the device descriptors being selected from a specified set of device descriptors.

The topology deduction module comprises processor readable instructions which cause the processor to: sort the encoded connectivity patterns according to topological dependency; initialize the network-topology image to comprise unconnected devices of the set of identified devices; identify all occurrences of the each connectivity pattern; and incorporate the occurrences in the network-topology image.

The topology deduction module comprises processor readable instructions to cause the processor to: select a target switch among the plurality of heterogeneous devices; select a port in the target switch; and acquire an address forwarding table for the port.

If the address forwarding table includes multiple entries, with all entries corresponding to end devices among the set of identified devices, the topology deduction module concludes that an unmanaged node connects the end devices to the port.

The topology deduction module further comprises processor readable instructions which cause the processor to: identify a first switch among the plurality of heterogeneous devices; identify a second switch among the plurality of heterogeneous devices; select a port pair, a first port from among ports of the first switch and a second port from among ports of the second switch; and acquire a first address-forwarding table of the first port and a second address-forwarding table of the second port.

If the first address forwarding table and the second address forwarding table are non-intersecting and have a complete union, the topology deduction module concludes that the first switch has a direct connection to the second switch. A complete union occupies an entire address space, If the first address forwarding table and the second address forwarding table have a complete union and common end devices, the topology deduction module concludes that an unmanaged node connects the end devices to the port pair.

BRIEF DESCRIPTION OF THE DRAWINGS

Embodiments of the present invention will be further described with reference to the accompanying exemplary drawings, in which:

FIG. 6 illustrates a set of descriptors of network devices;

FIG. 13 illustrates device characterization vectors for use in a second method of device classification in accordance with an embodiment of the present invention;

FIG. 14 illustrates modified device characterization vectors derived from the device characterization vectors of FIG. 12 where inconsequential entries are replaced by zeros for use in the second method of device classification;

FIG. 15 illustrates masks associated with the device characterization vectors of FIG. 13 for use in the second method of device classification;

DETAILED DESCRIPTION

Terminology

Network Topology: The layout of network nodes (devices) and their interconnection by links constitute the network's topology.

Layer 2 (L2): The term refers to the second layer (also called the Data Link Layer) according to the OSI model.

Address Forwarding Table (AFT): An AFT is a table which identifies the outgoing port to forward packets destined for a particular destination MAC address.

Forwarding Data Base (FDB): The terms Address Forwarding Table (AFT) and Forwarding Data base (FDB) are used interchangeably.

Address Resolution Protocol (ARP): The ARP Translates IP addresses to MAC addresses.

Simple Network Management Protocol (SNMP): SNMP is an application layer protocol that facilitates the exchange of management information between network devices. A network employing the SNMP comprises managed devices and network-management systems (NMSs). A managed device is a node having an SNMP agent. An agent is a software module installed in a managed device. A managed device may be a router, a switch, or a computer host. The agent presents information in an SNMP-compatible format. An NMS runs monitoring applications and provides the processing and storage resources required for network management.

Management IP/MAC: A management IP and MAC is an address on a switch, which uniquely identifies the switch. It is an address assigned to the whole switch entity.

Management Information Base (MIB): A MIB is a collection of data organized in a hierarchical fashion. The information may define a single object or multiple related objects. The data determines the properties of the managed object within a managed device, such as a router or a switch. Each managed device keeps a database of values for each of the definitions written in the MIB.

Object Identifier (OID): An OID uniquely identifies managed objects in a MIB hierarchy. This can be represented as a tree. All of the manageable features of all products are arranged in a tree. Each branch of the tree has a number and a name, and the complete path from the top of the tree down to an object of interest forms the object identifier.

Virtual LAN (VLAN): A VLAN is a group of hosts with a common set of requirements that communicate as if they were attached, regardless of their physical location. A VLAN has the same attributes as a physical LAN, but it allows for end stations to be grouped together even if they are not located on the same LAN segment.

Figure 1:
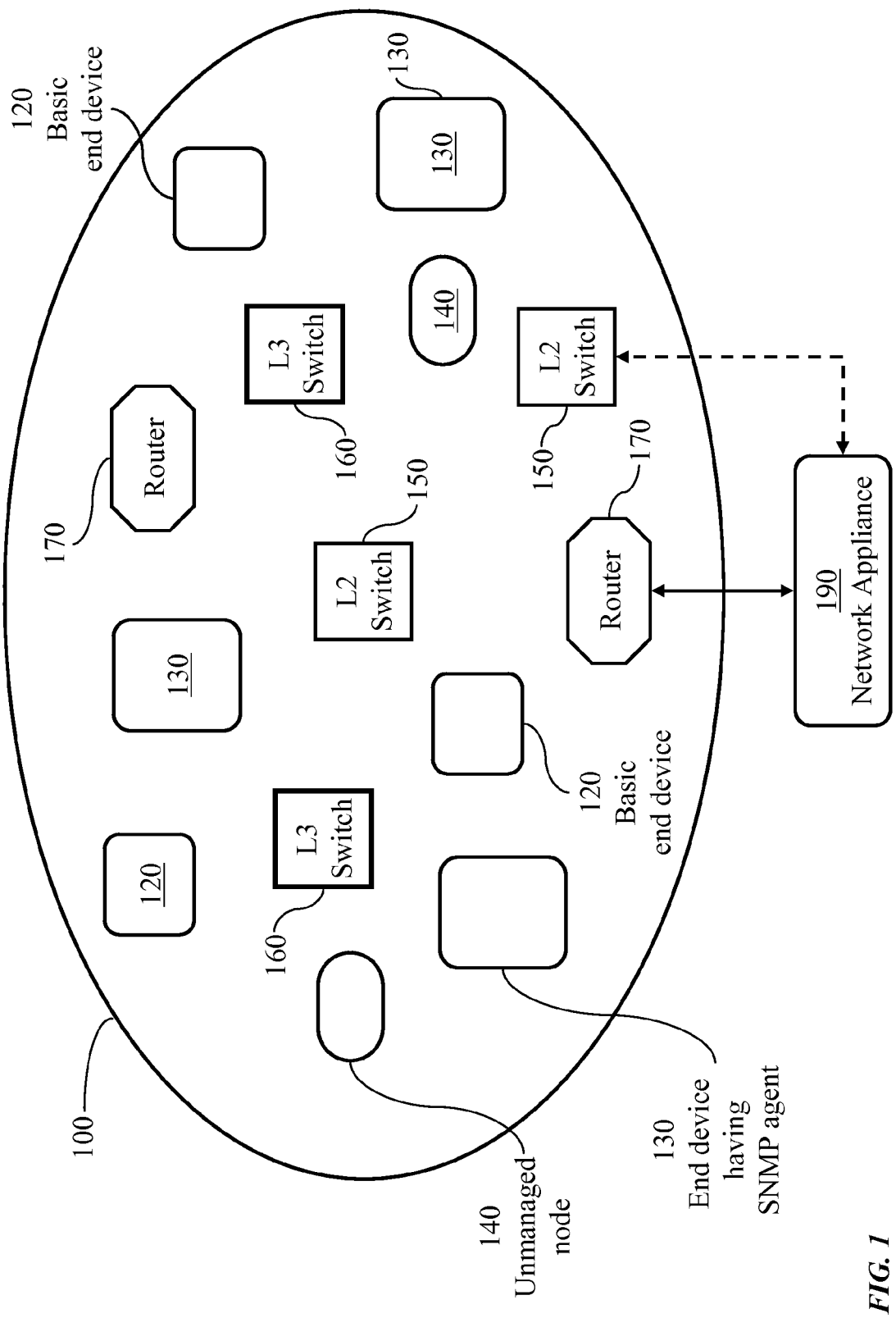
FIG. 1 illustrates network devices and a network appliance communicatively coupled to at least one of the network devices, in accordance with an embodiment of the present invention.

FIG. 1 illustrates a network 100 comprising heterogeneous devices and a network appliance 190 communicatively coupled to one of the devices. The network appliance 190 may be collocated with a network device or connected to a device through an access network (not illustrated). In one embodiment, the heterogeneous devices include basic end devices 120, such as a personal computer or a printer, end devices 130 each having installed thereon a network-management agent, such as an agent of the standardized "simple network management protocol (SNMP)", an unmanaged node 140, which may be a hub or an unmanaged switch, layer-2 switches 150, layer-3 switches 160, and routers 170.

Figure 2:
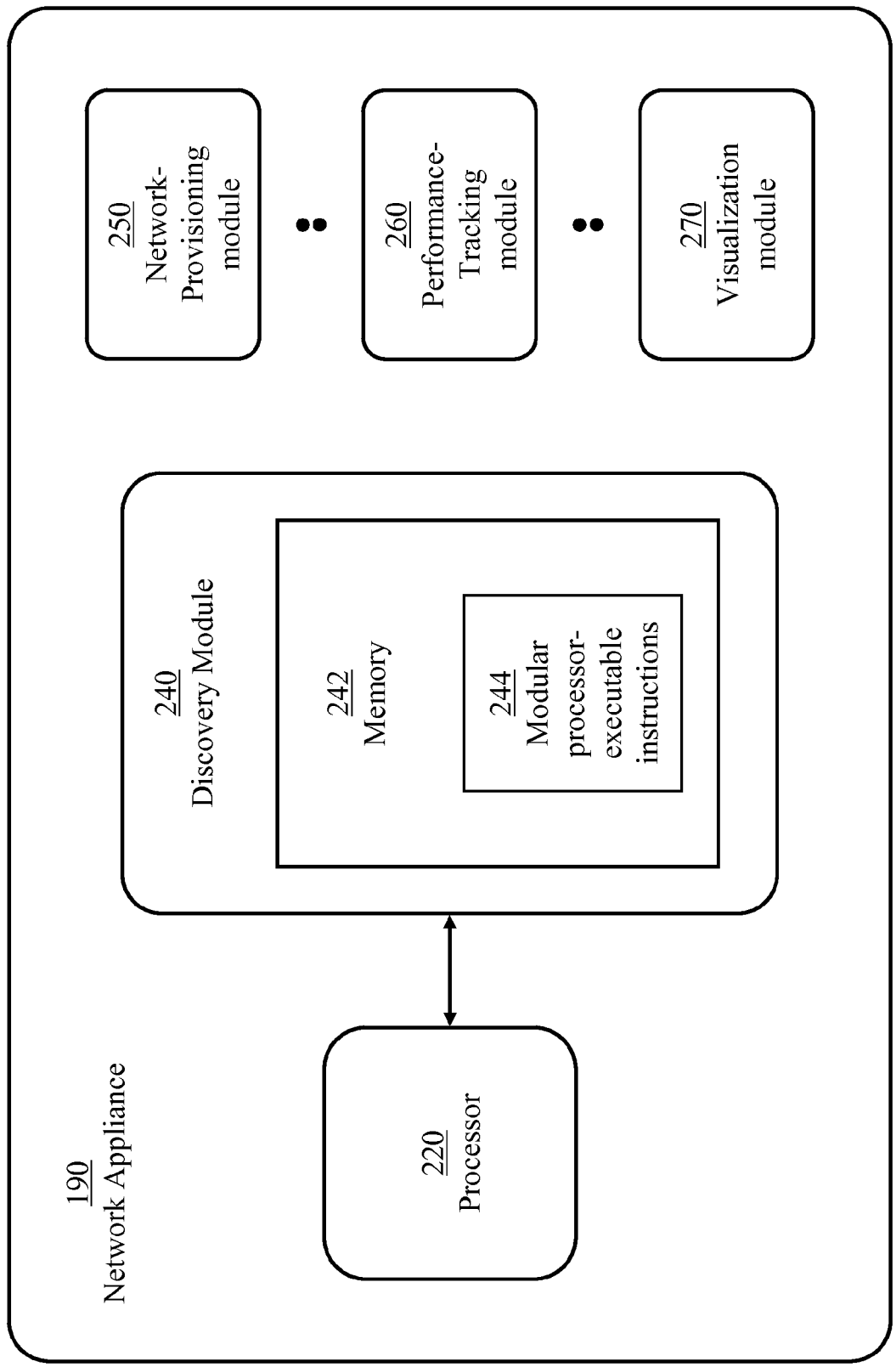
FIG. 2 illustrates the network appliance of FIG. 1 comprising a network-discovery module in accordance with an embodiment of the present invention.

FIG. 2 illustrates a network appliance 190 comprising a processor 220, and a computer readable storage medium, e.g. memory, DVD, CD-ROM, having computer readable instructions stored thereon for execution by the processor, to form the following modules: a discovery module 240, a network-provisioning module 250, a performance-tracking module 260, and a visualization module 270. In particular, the discovery module 240 comprises a memory 242, or another computer readable medium, having stored thereon modular processor-executable instructions 244 for performing network discovery processes to be described below. The network appliance may be a special-purpose computing device or a general-purpose computer device.

Figure 3:
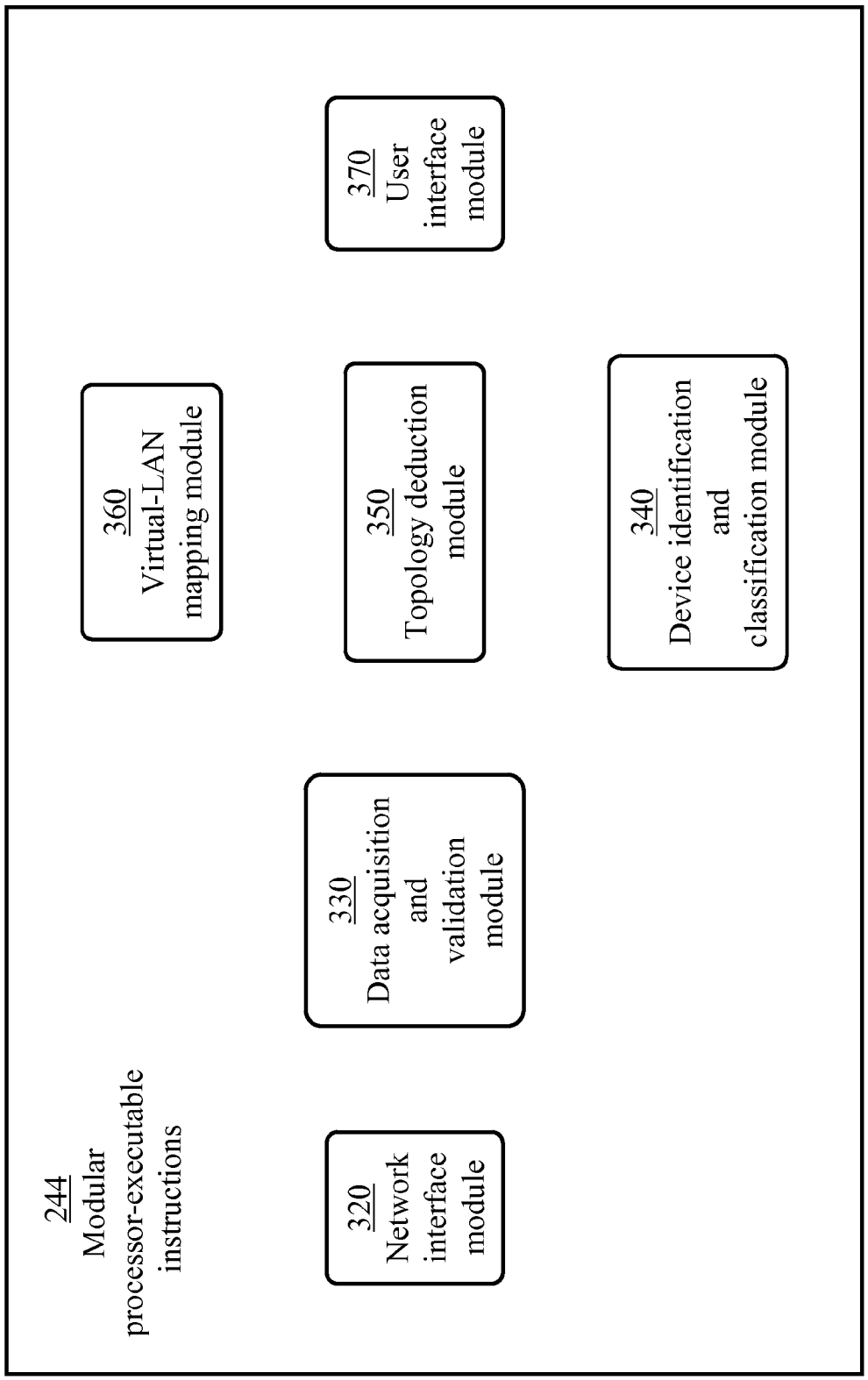
FIG. 3 illustrates components of the discovery module of FIG. 2 performing topology-discovery functions in accordance with an embodiment of the present invention.

FIG. 3 illustrates components of the modular processor-executable instructions 244 organized into additional modules, namely, a network-management interface module 320, a data acquisition and validation module 330, a device identification and classification module 340, a topology deduction module 350, a Virtual-Local-Area-Network mapping module 360, and a user-interface module 370. Modules 320 to 370 comprise computer readable instructions, which are stored in a single memory device, or multiple memory devices constituting memory 242.

Network interface 320 formats data sent to network devices 120-170 and interpreting data received from the network devices. Data acquisition and validation module 330 formulates queries for data collection from network devices 120-170 and validating received data to ensure correctness and completeness. Device identification and classification module 340 contains instructions which cause processor 220 to identify network devices and determine a device type for each identified device according to processes described below with reference to FIGS. 6 to 19. A topology deduction module 350 contains instructions which cause processor 220 to synthesize a network-topology image according to a process described below with reference to FIGS. 19 to 27.

Figure 4:
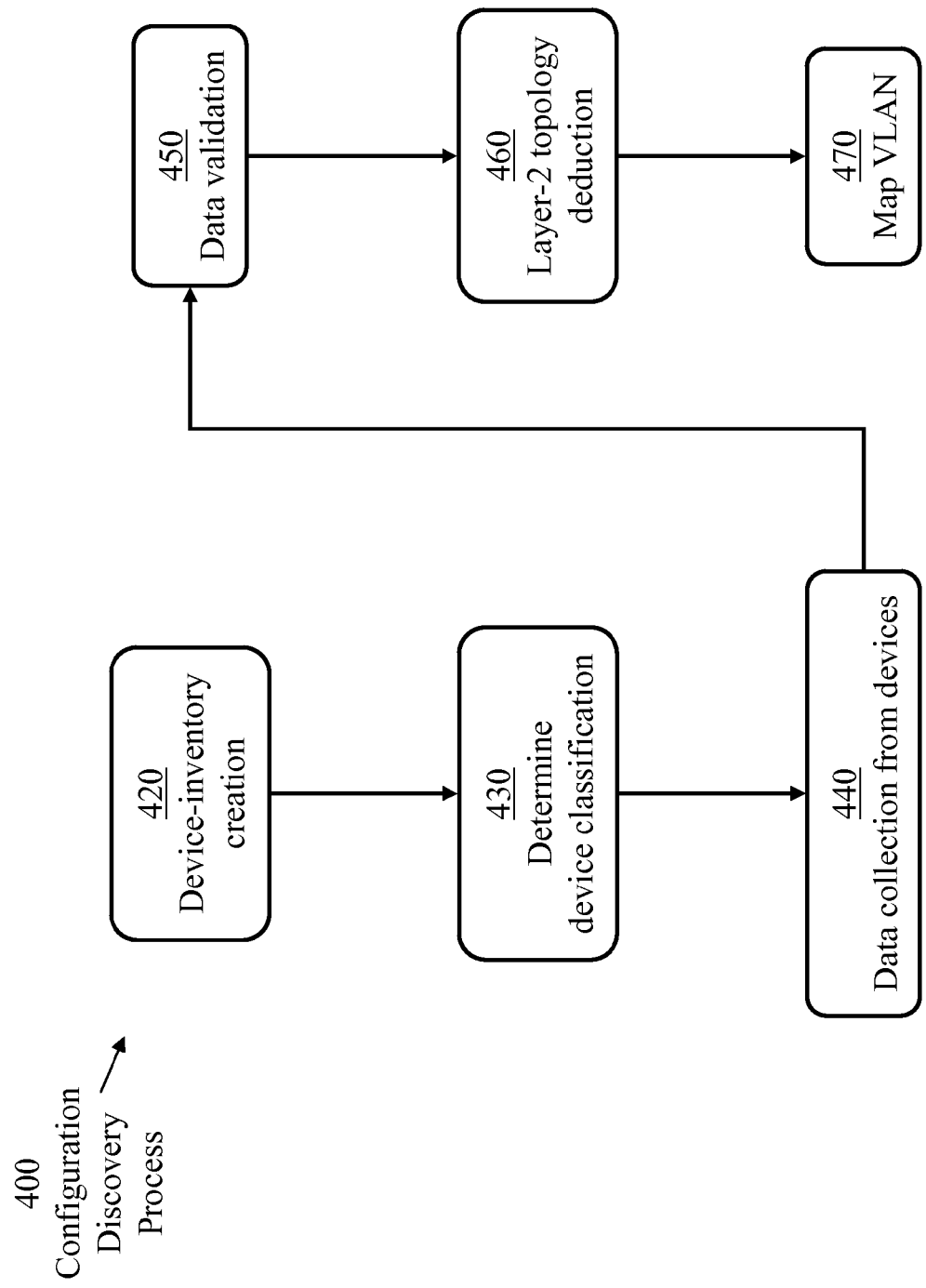
FIG. 4 illustrates a topology-discovery process where network devices are joined together to form a topology based on collected and sanitized data, in accordance with an embodiment of the present invention.

FIG. 4 illustrates a topology discovery process 400 implemented by appliance 190. Step 420 creates a device inventory initially comprising addresses of identified network devices. Step 430 determines a device type, from among a set of predefined device types, for each identified network device. Step 440 collects address-forwarding data from the identified devices to enable determining connectivity of identified network devices. Step 450 filters out incomplete data and data which fail predefined sanity checks. Step 460 determines layer-2 topology as detailed in FIG. 21. Step 470 maps virtual local-area networks (VLANs) onto discovered layer-2 topology of network 100.

Figure 5:
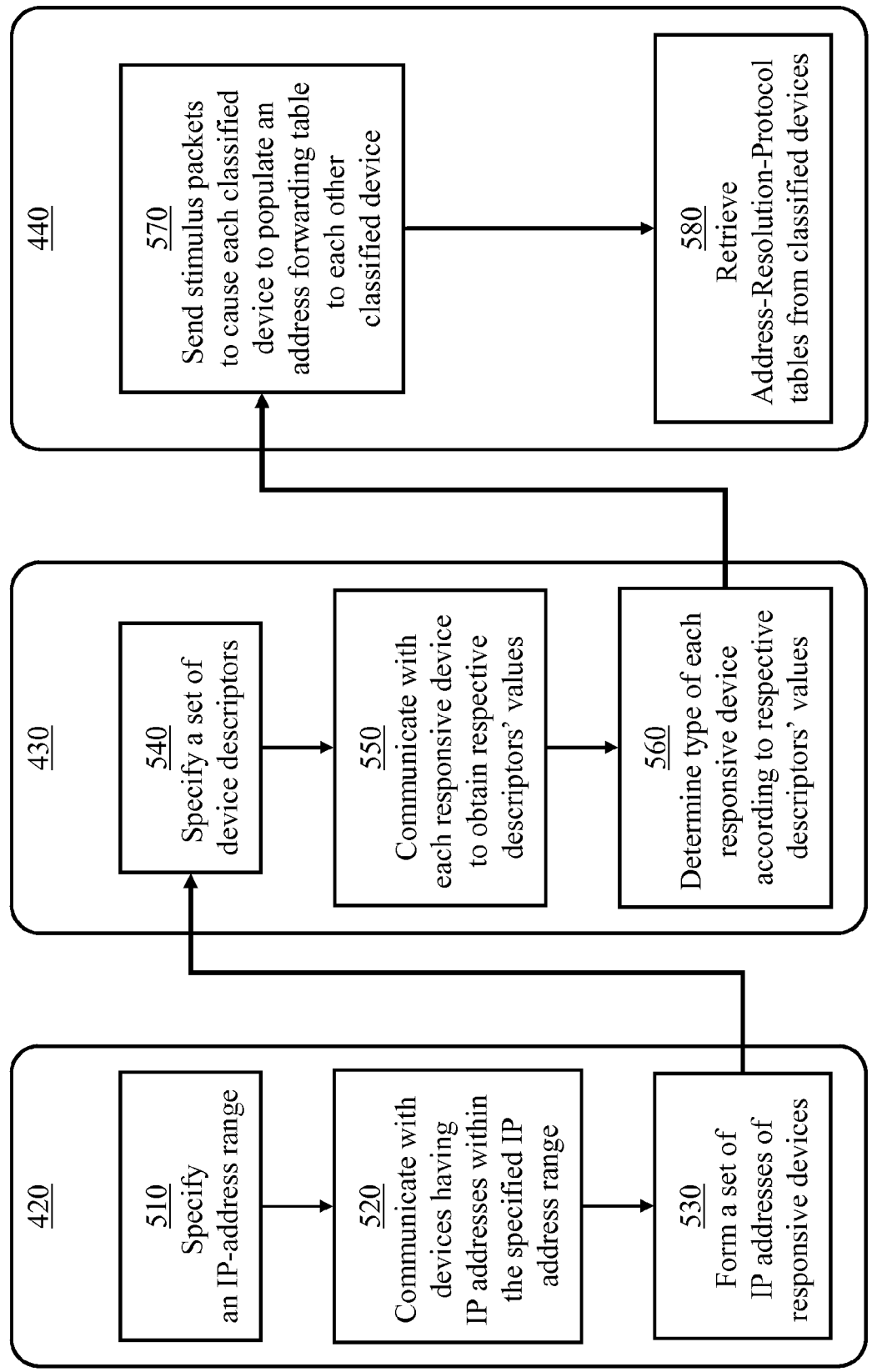
FIG. 5 details steps of device-inventory creation, device classification, and data collection in accordance with an embodiment of the present invention.

FIG. 5 details steps 420, 430, and 440 of the discovery process of FIG. 4. To create device inventory (step 420), an IP-address range which covers the network or sub-network of interest is specified (step 510). The network appliance 190 communicates with addresses within the IP-address range to identify responsive devices (step 520). A set of IP addresses of the responsive devices forms a device inventory (step 530).

The identified devices are then classified (step 430) to determine a device type of each identified device in the device inventory. The device-classification step 430 starts with acquiring a set of predefined device descriptors (step 540). The network appliance 190 communicates with the responsive devices of the device inventory to obtain, from each individual device, values of descriptors pertinent to the individual device (step 550). The values of descriptors determine a device type (step 560) according to preset rules. The network appliance may broadcast a set of messages to the network devices requesting descriptors' values. Alternatively, the network devices may be targeted one at a time.

In order to determined connectivity of classified devices, address-forwarding data are collected from devices (step 440).

In order to populate address forwarding table entries, on all switches, with the media-access-control (MAC) addresses of all connected devices, the network appliance 190 sends stimulus packets which cause each switch to populate an address forwarding table to each other device (step 570). In accordance with one embodiment, stimulus packets are modified "ping packets". The network appliance selects a first switch from the inventory of identified devices, and sends modified ping packets to all other switches of the inventory. The source IP address of each of the modified ping packets is set to be the IP address of the selected switch. The network appliance selects a second switch from the inventory and sends modified ping packets to all switches, other than the second switch, with the source IP address set to be the address of the second switch, and so on.

With N>1 devices in the inventory of identified devices, each device is selected as a candidate source. Modified ping packets, with the source IP address of each packet set to be the IP address of a candidate source, are sent from the network appliance to all devices other than the candidate device. Thus, the network appliance sends a total of (N-1)×(N-1) modified ping packets in order to populate all switches with address-forwarding data.

Address-resolution-protocol tables are also retrieved from the classified devices (step 580).

FIG. 6 illustrates a set 600 of device descriptors for use in classifying network devices.

Discovery and Classification of Network Devices

The first step in the topology-discovery process is to create a complete inventory of network devices and classify them according to predefined device types. The network inventory is created by sending "ping" packets to IP addresses in a specified address range. The specified address range may cover discontinuous network address blocks. For each IP address, multiple ping packets may be sent to ensure correctness. The IP addresses for all devices responding to the ping packets are included in a network "Inventory List".

Each identified device is further classified according to a predefined set of device types. In accordance with one embodiment, the set of predefined device types comprises (1) a basic end device, (2) an end device supporting an SNMP (simple network management protocol) agent, (3) a switch (also simply referenced as a layer-2 switch), (4) a layer-3 switch, (5) a router, and (6) an unmanaged node which may be a hub or an unmanaged switch. An identified device that cannot be associated with one of the six device types is considered to be of an indefinite type.

Classification of network devices relies on a set of predefined descriptors, hereinafter denoted $D_0$, D1, D2*, D3, D4, D5, and D6 (FIG. 6).

Descriptor $D_0$ determines presence of an SNMP agent. The classification phase begins with a check of whether a device responds to SNMP messages. Responses to SNMP requests related to IP-forwarding capability of system services indicate whether an SNMP agent is installed in a device. After retries, if SNMP requests timeout, the device is considered to be an end device without SNMP support.

Descriptor D1 determines IP-forwarding capability. When devices start responding to SNMP requests, the first check is for an IP-forwarding parameter which determines whether a device participates in forwarding IP packets in the network. An IP-Forwarding parameter of value "01" (binary) indicates that a device forwards packets. So, the device can either be a router, a Layer-3 switch or a firewall. An IP-Forwarding parameter of value "10" (binary) indicates that a device does not forward IP packets. This value exists in end devices with SNMP support, such as printers, or in switches with only Layer-2 capabilities. An IP-Forwarding of value other than "01" or "10" indicates that a respective device may have incorrect management data or do not contain an IP-Forwarding parameter.

Descriptor D2* indicates System services. Descriptor D2* indicates services a device offers. Four values, "000", "010", "100", "110", of D2 define device types. Removing the redundant rightmost bit, 0, descriptor D2* may be represented as a 2-bit descriptor D2. The four values of D2, "00", "01", "10", and "11", respectively indicating device types of (a) an end device with an SNMP agent, (b) a layer-2 switch, (c) a router, or (d) a layer-3 switch.

Descriptor D3 relates to IP-address configuration. Descriptor D3 indicates whether all active interfaces have IP-addresses, i.e., whether the device is a layer-3 switch. A value of "0" indicates a layer-3 switch. A value of "1" indicates a router, a firewall, or an end device with an SNMP agent.

Descriptor D4 relates to Host-resource MIB. Presence of host resources MIB (D4 value of 1) indicates that a device is an end system with SNMP support.

Descriptor D5 relates to Forwarding-table entries. An entry indicates whether a forwarding table contains any forwarding media-access-control (MAC) addresses. Valid forwarding table entries indicate that a device is a layer-2 switch.

Descriptor D6 relates to System description. A keyword in the System Description of a device indicates a device type. The System Description is therefore scanned to detect keywords such as "Switch" or a "WLAN" (Wireless Local-Area Network).

Figure 7:
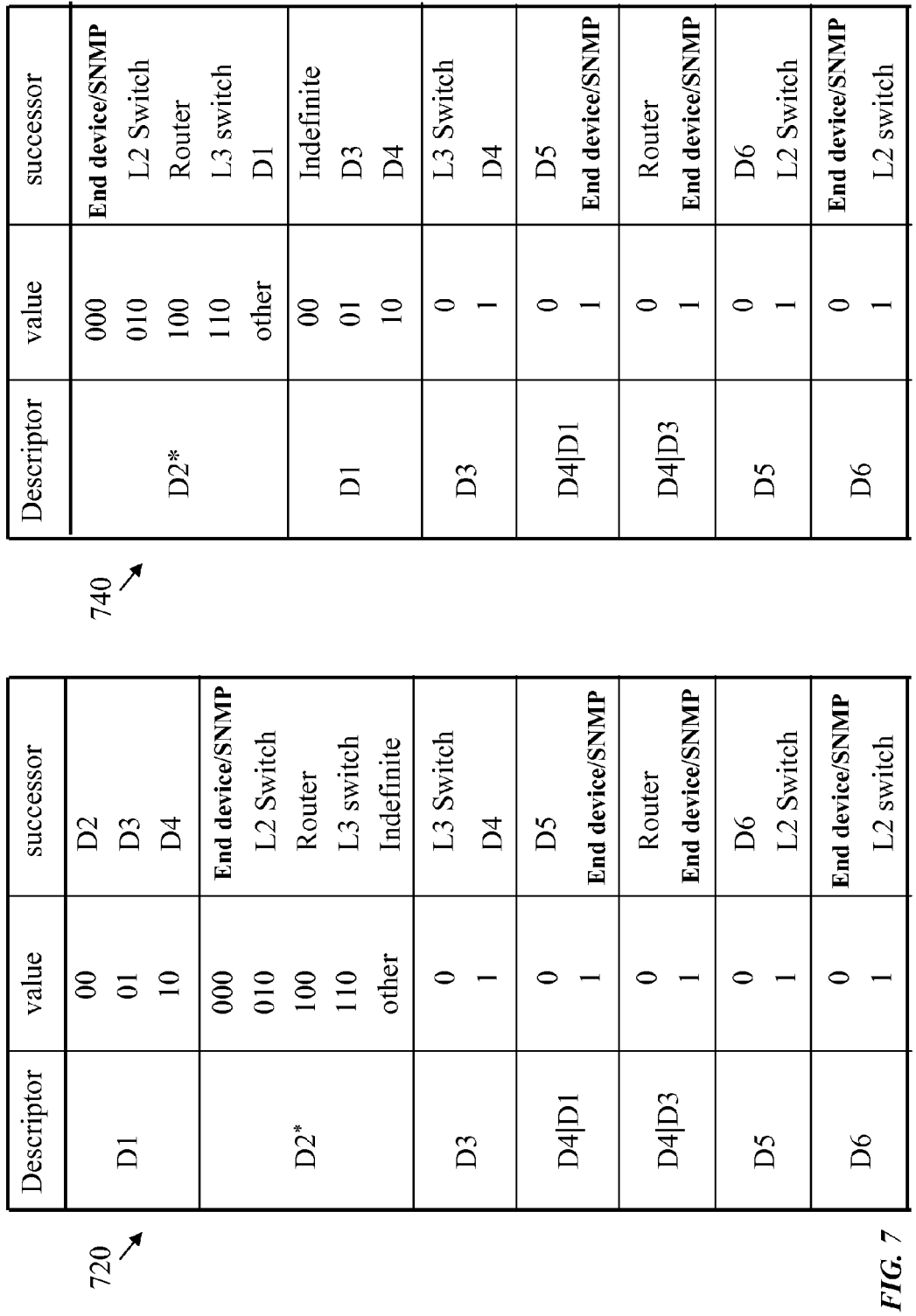
FIG. 7 illustrates in a tabular form numerical values assigned to each descriptor, each value defining a successor of each descriptor, in accordance with an embodiment of the present invention.

FIG. 7 illustrates in a tabular form numerical values assigned to each of descriptors D1, D2, D3, D4, D5, and D6, each assigned a set of values with each value indicating a property of a device. The value of a descriptor indicates either a device type from among a set of predefined device types or a successor descriptor. For example, descriptor D1 may have a binary value "00", "01", or "10". A value of "01" indicates that a queried device forwards packets and, therefore, the device may be a layer-3 switch 160 or a router 170. A value of "10" indicates that the queried device does not forward packets and, hence, the device may be a layer-2 switch 150 or an end-device 130. A value of "00" (or generally any value other than "01" or "10") indicates that the value of the descriptor is not available. In the example of FIG. 7, descriptor D4 may succeed D1 or D3. Hence, there are two entries denoted D4|D1 and D4|D3 in each of arrangements 720 and 740.

Figure 8:
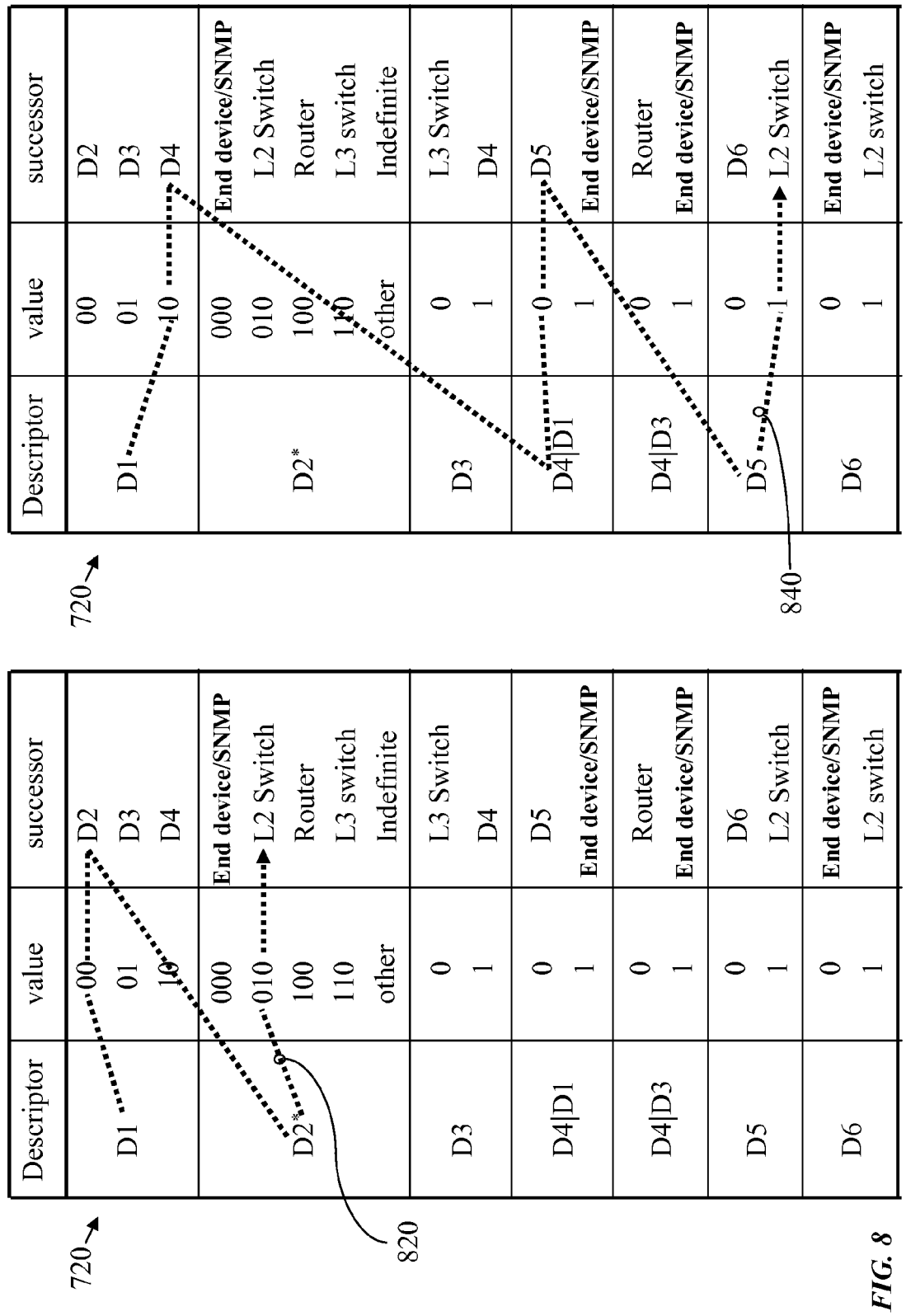
FIG. 8 illustrates values of descriptors defining a device type, in accordance with an embodiment of the present invention.

At least one descriptor is a "root descriptor". A root descriptor has at least one successor descriptor and is not a successor of any other descriptor. If there is more than one root descriptor, only one is selected to start a device classification process. For example, each of descriptors D1 and D2* qualifies as a root descriptor. In an arrangement 720 (FIG. 7), descriptor D1 is selected to start the device-classification process and a value "00" of D1 leads to descriptor D2*. A value of "100" (binary) of D2* indicates that a respective device is indefinite. In arrangement 740 (FIG. 7), the device-classification process starts with descriptor D2* and a value of "100" (binary) of D2* directs the classification process to D1. FIG. 8 illustrates values of descriptors defining a device type. A value of D1 of "00" directs the device-classification process to D2*, and a value of D2* of "010" indicates that a respective device is a layer-2 switch. A value of D1 of "10" leads to D4, a value of D4 (reached from D1 and denoted D4|D1) of "0" leads to D5, and a value of D5 of 1 indicates that a respective device is a layer-2 switch.

Figure 9:
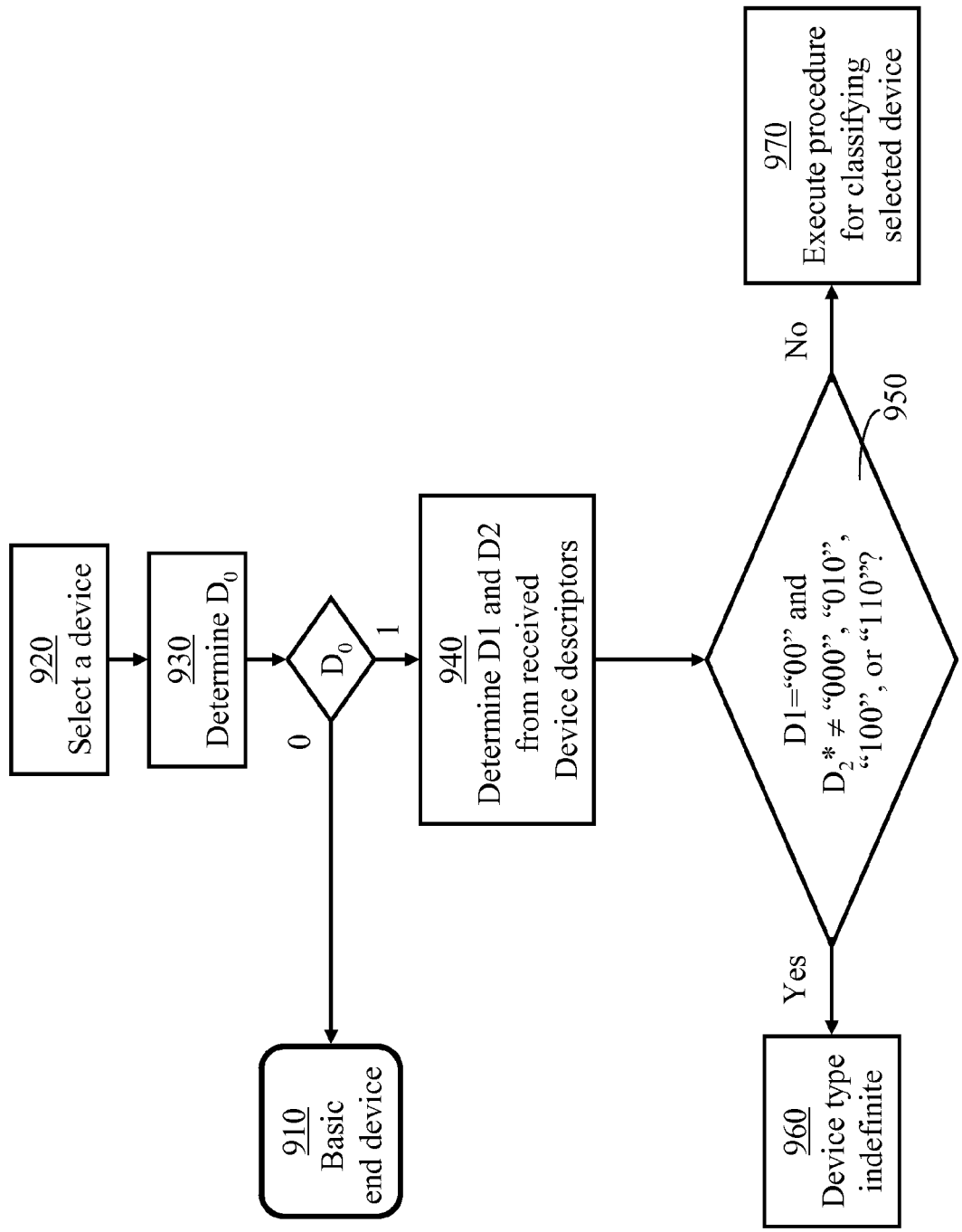
FIG. 9 illustrates exemplary descriptor values determining whether a device type is indefinite.

FIG. 9 illustrates descriptor values which determine that a respective device type is indefinite. In step 920, a network device is selected and in step 930, the value of $D_0$ is determined. A value of $D_0$ of "0" (no response to an SNMP message) indicates a device not supporting an SNMP agent (910). A value of descriptor $D_0$ of "1" indicates presence of an SNMP agent. Step 940 determines values of D1 and D2. When D1 has a value of "00" and D2* has a value other than the four values 0, 2, 4, 6 ("000", "010", "100", and "110") defining device types, it is concluded (step 950) that the respective device does not provide sufficient information and the device type is reported as "indefinite" (960). Otherwise, step 970 executes a procedure for classifying the selected device.

Figure 10:
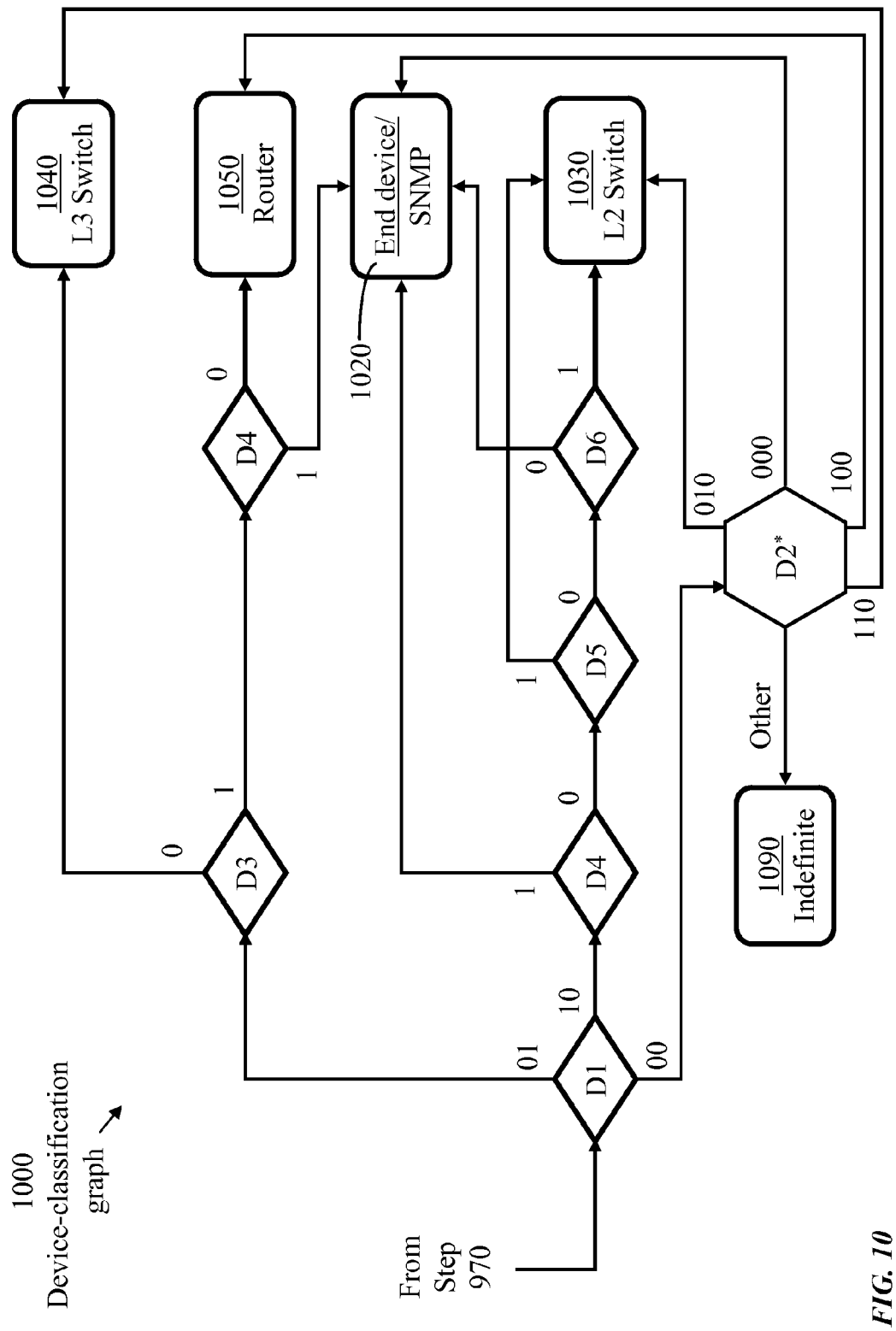
FIG. 10 illustrates a device-classification graph for use in an embodiment of the present invention.

FIG. 10 illustrates a device-classification graph 1000 based on arrangement 720 of FIG. 7. A device is classified (characterized) to be one of an end device having an SNMP agent (1020), a layer-2 switch (1030), a layer-3 switch (1040), a router (1050), or an indefinite device (1090). A value of D1 of "01" leads to "D3" and a value of D3 of "0" indicates a layer-3 switch. Thus, the graph of FIG. 10 is traversed, starting with root descriptor D1 until a device type is reached. Notably, only values of descriptors traversed in a graph path from the root descriptor to an indication of a device type need be acquired from a device and requests for the values may be sent sequentially to the device. Alternatively, it may be advantageous to request values of all descriptors simultaneously, especially in a case where the network appliance is at a significant distance from the network device to which the network appliance connects and sequential data collection may cause undesirable delay.

Figure 11:
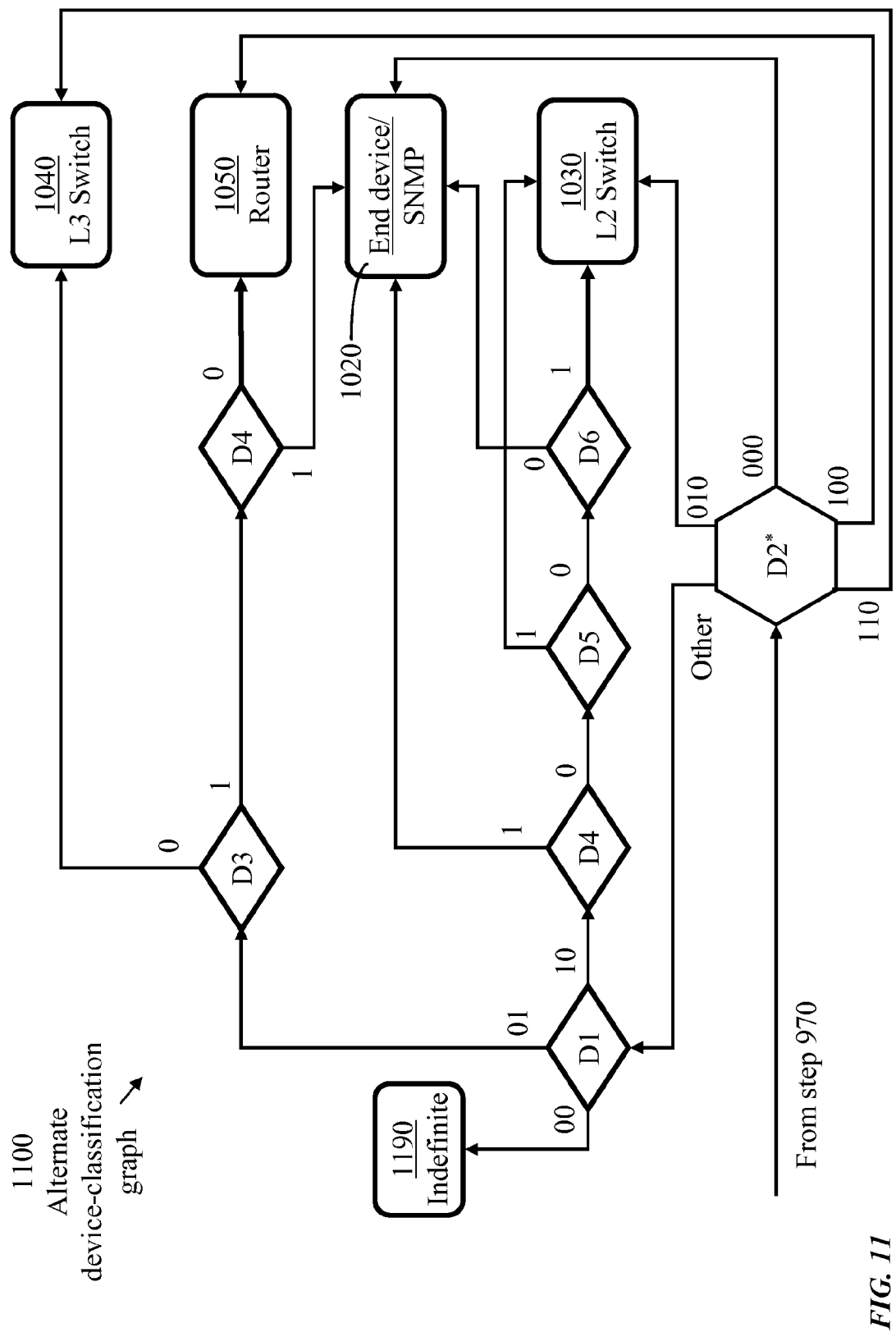
FIG. 11 illustrates an alternate device-classification graph for use in an embodiment of the present invention.

FIG. 11 illustrates an alternative device-classification graph 1100 based on arrangement 740 of FIG. 7. A value of D2* of "000" indicates that a device is an end device with an SNMP agent. A value of "010" indicates a layer-2 switch, a value of "100" indicates a router, and a value "110" indicates a layer-3 switch. Any other value of D2* indicates that a device type cannot yet be determined and the device-classification process is directed to examining descriptor D1. A value of D1 other than "01" or "10" indicates that a device type cannot be determined (reference 1190). Otherwise the tree branching from D1 is traversed to reach one of the leaves 1020, 1030, 1040, or 1050.

Notably, when D1 has a value of "01" or "10", and D2* has a value of "000", "010", "100", or "110", both the device-classification graph of FIG. 10 and the alternative device-classification graph FIG. 11 may be used and result agreement further confirms correctness.

Figure 12:
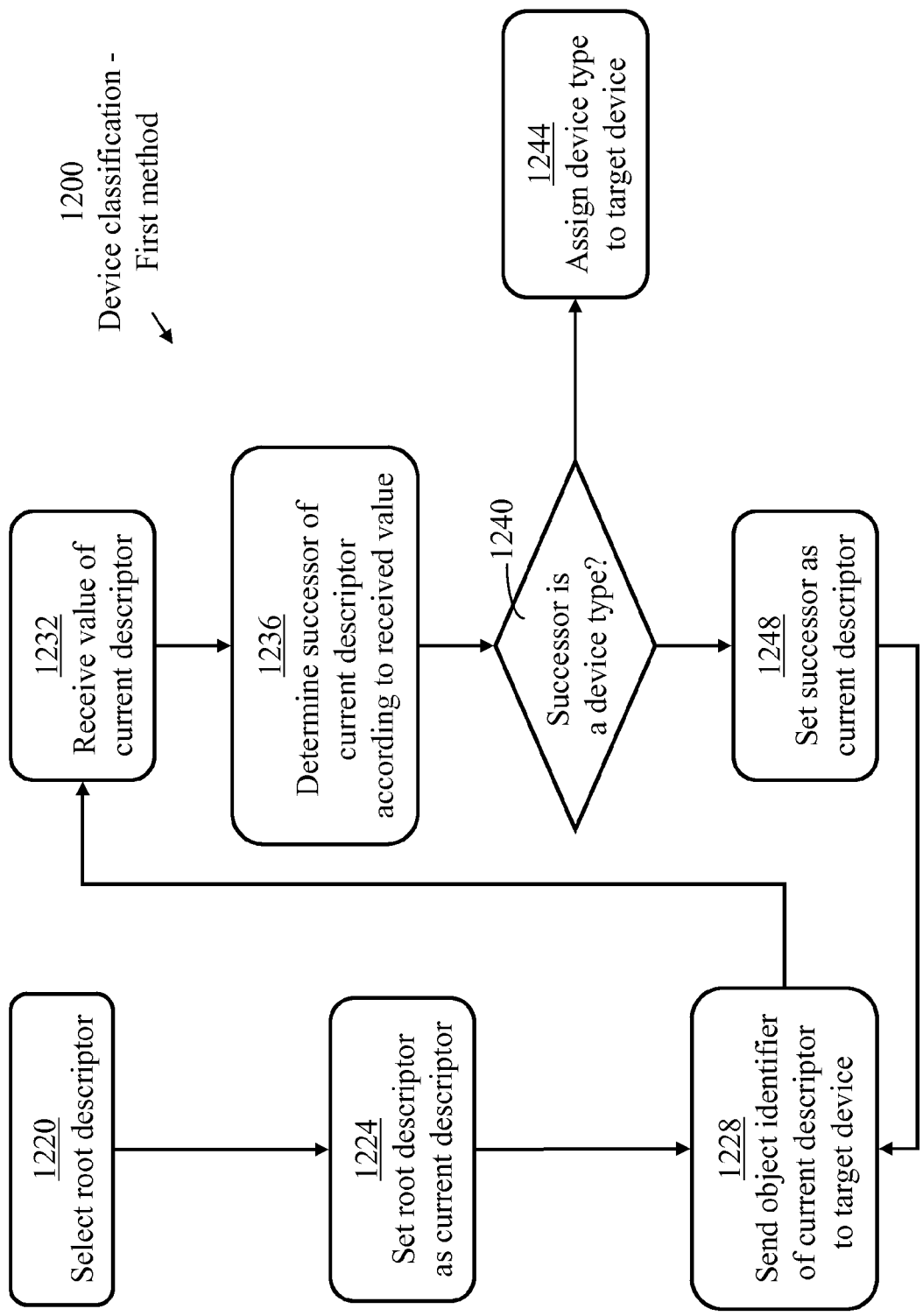
FIG. 12 illustrates a first method for device classification implemented by the appliance of FIG. 1 in accordance with an embodiment of the present invention.

FIG. 12 is a flow chart 1200 illustrating a first method of data classification implemented by the network appliance 190 of FIG. 1. In step 1220, root descriptors are determined and one is selected. The selected root descriptor is treated as a current descriptor (step 1224) and a message is sent from network appliance 190 to a target device from among the inventory of identified network devices requesting a value of the current descriptor (step 1228). The request may use a keyword, or any other means, to indicate the current descriptor. The network appliance 190 receives a value of the current descriptor (step 1232) and determines a successor of the current descriptor according to the received value (step 1236). Step 1240 determines whether the successor represents a recognizable device type, in which case the target device is associated with the recognizable device type (step 1244). Otherwise, the successor is considered a current descriptor (step 1248) and a new message is sent (step 1228) from the network appliance 190 to the target device requesting a value of the current descriptor. The process of FIG. 12 may be repeated for each device in the inventory of identified devices.

In a second method of device classification, in accordance with an embodiment of the present invention, the device identification and classification module 340 of discovery module 240 of network appliance 190 uses the descriptor arrangement 720 of FIG. 7 to formulate a table 1300 (FIG. 13) of device characterization vectors 1320 where each characterization vector 1320 corresponds to a device type from among predefined recognizable device types. Table 1300 comprises 10 device characterization vectors 1320, denoted $P*^{(0)}$, $P*^{(1)}$, ..., $P*^{(9)}$, As illustrated in FIG. 7, different combinations of descriptor's values may correspond to a single device type (layer-2 switch in the example of FIG. 7). Thus, multiple characterization vectors may correspond to a single device type as indicated in table 1300.

Notably, a characterization vector 1320 may include inconsequential entries the values of which do not affect device classification. Inconsequential entries are commonly referenced as "don't care" values. In binary representation, a bit of inconsequential value ("0" or "1") is conventionally marked "×".

FIG. 14 illustrates modified device characterization vectors (table 1400) derived from the device characterization vectors of FIG. 13 where inconsequential entries (having "don't care" logical values) are replaced by zeros. The modified characterization vectors are denoted $P^{(0)}$, $P^{(1)}$, ..., $P^{(9)}$.

FIG. 15 illustrates a table 1500 of masks where each mask is associated with a respective device characterization vector 1320 (FIG. 13). A mask is derived from a corresponding characterization vector by replacing every inconsequential bit ("×") with a "0" and every other bit with "1". The masks are denoted $M^{(0)}$, $M^{(1)}$, ..., $M^{(9)}$.

The second method of device classification relies on the modified device characterization table of FIG. 14 and the table of masks of FIG. 15.

The data acquisition and validation module 330 of discovery module 240 of network appliance 190 sends a set of messages to a specific device from among the identified inventory of the set of heterogeneous devices of FIG. 1, each message requesting a value of one of the descriptors D1, D2, D3, D4, D5, and D6. Upon receiving values of the descriptors from the specific device, the device identification and classification module 340 (FIG. 3) formulates a description vector the entries of which indicating received values of the descriptors.

Figure 16:
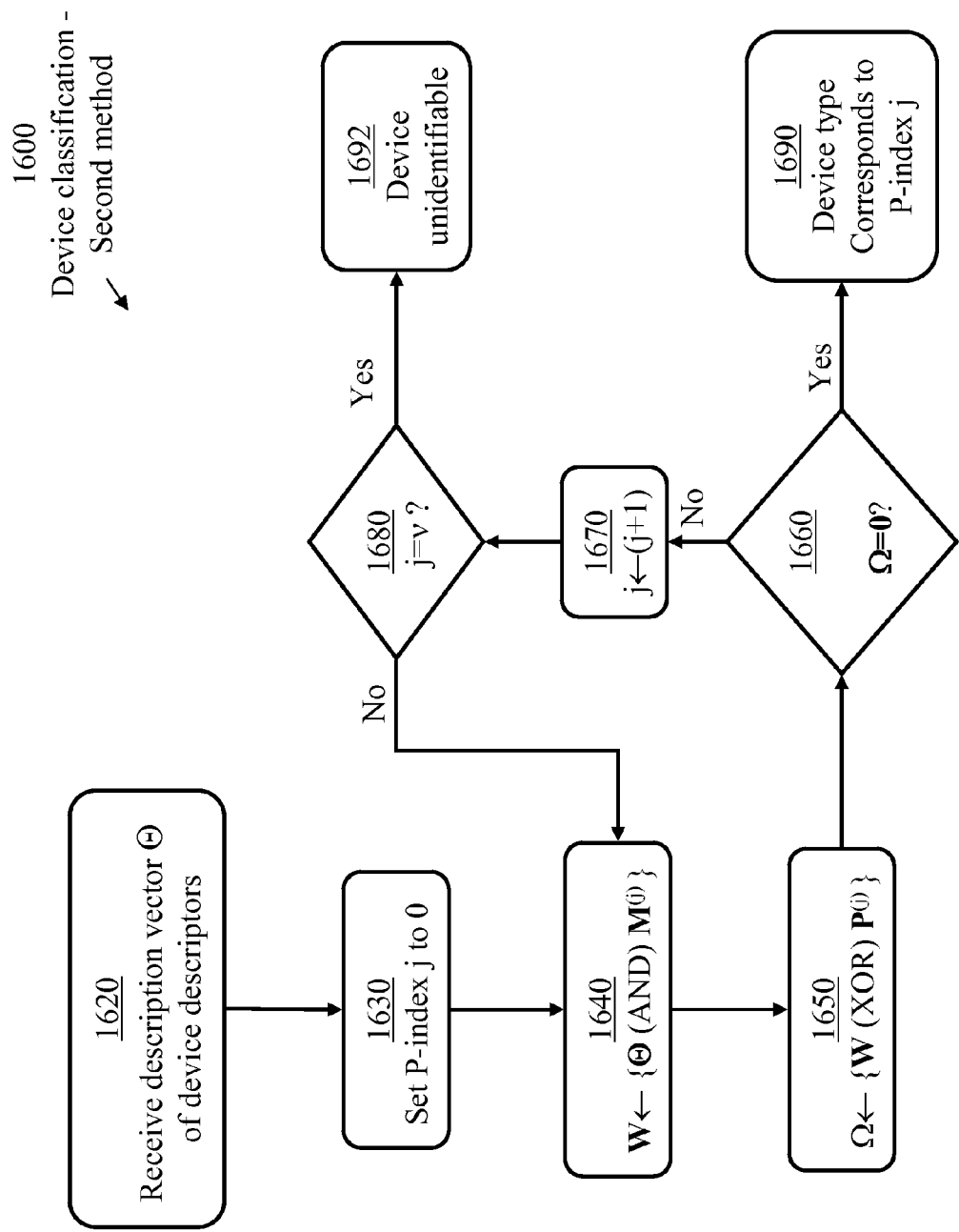
FIG. 16 illustrates the second method of device classification based on response to queries sent by the appliance of FIG. 1, in accordance with an embodiment of the present invention.

FIG. 16 is a flow chart 1600 illustrating the second method of device classification. As illustrated in FIG. 16, upon receiving a description vector Θ (step 1620), an index of a characterization vector (j=0) is selected (step 1630). A filtered description vector W is derived from the received description vector Θ using a bitwise "AND" operation with mask M(j) (step 1640). A bitwise EXCLUSIVE-OR (XOR) logical operation is performed using the filtered description vector W and the selected characterization vector $P^{(j)}$ as indicated in step 1650. The result, Ω, of the XOR operation, is a bit string which has a value of zero (vector "0000...") if the received description vector Θ corresponds to the selected characterization vector $P^{(j)}$, which starts with $P^{(0)}$. Thus a value of Ω of zero (step 1660) defines a device type according to a respective entry 1330 in table 1300 (step 1690).

If step 1660 determines that the value of Ω is not zero, another characterization vector is selected in step 1670 which increases the index j by 1. If step 1680 determines that all characterization vectors $P^{(0)}$ to $P^{(v-1)}$ have been selected, without reaching step 1690, the device identification and classification module 340 determines that the device is unidentifiable (of an indefinite type). Otherwise, if j is less than v, step 1640, leading to steps 1650 and 1660, is revisited.

Figure 17:
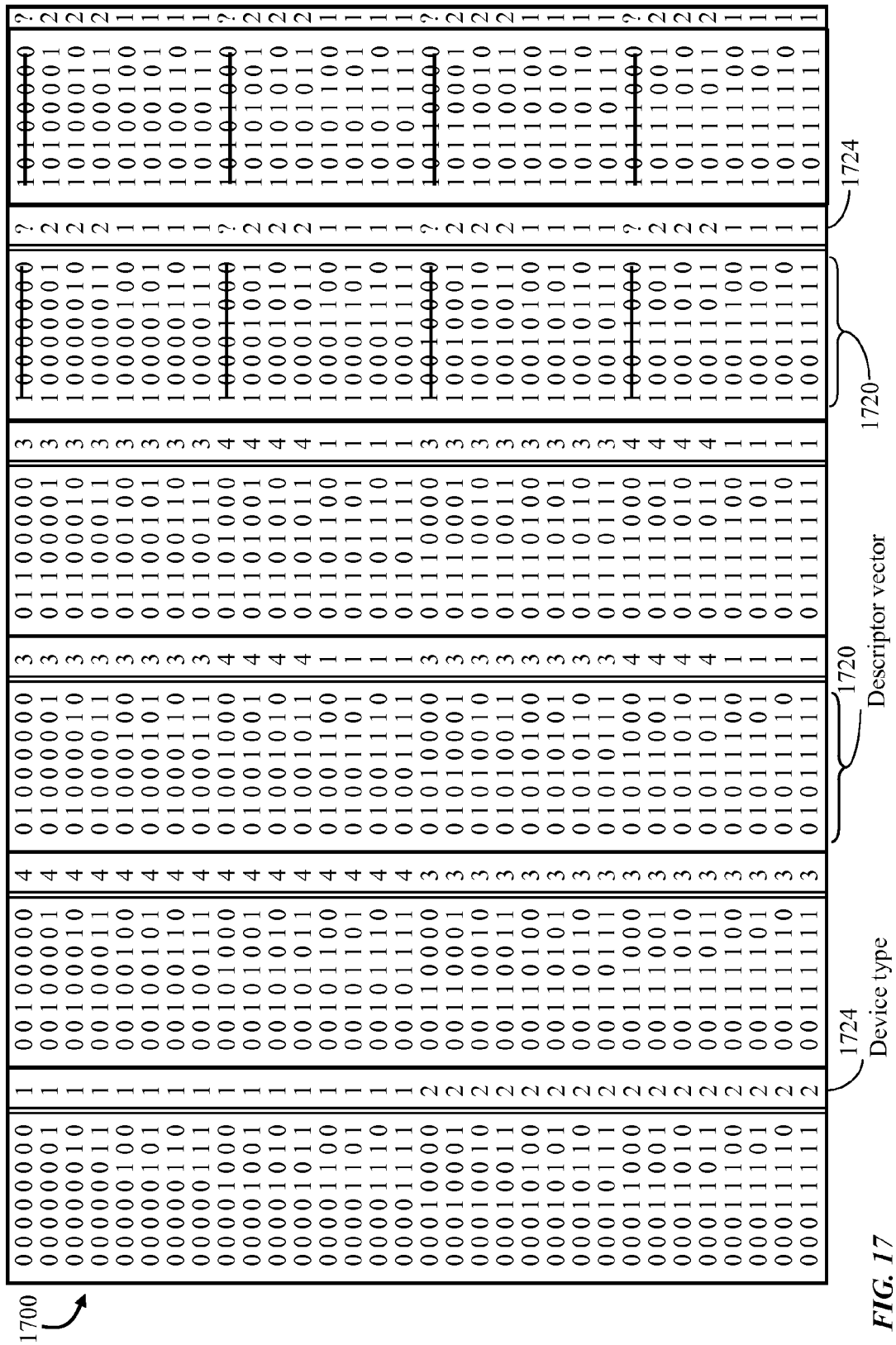
FIG. 17 illustrates device classifications corresponding to values of a descriptor vector, in accordance with an embodiment of the present invention.

A third method for device classification, in accordance with another embodiment, uses direct indexing of a lookup array as will be described with reference to FIG. 19. Each of the device characterization vectors 1320(0) to 1320(9) of FIG. 13 comprises eight bits. Hence, a lookup array would have at most 256 entries. Using the leftmost two bits of descriptor D1 as the most significant bits and the bit of descriptor D6 as the least significant bit according to order illustrated in FIG. 13, and observing that D1 does not have a value of "11" (binary), the lookup array need only have 192 entries. The device-characterization vector 1320(0), denoted $P*^{(0)}$, has four defined bits and four "don't care" bits. Thus, the corresponding device type (end-device with SNMP agent) of index "1" occupies sixteen ($2^4$) entries in the lookup array. Device-characterization vector 1320(5), denoted $P*^{(5)}$, has five defined bits and three "don't care" bits. Hence, the corresponding device type (layer-2 switch) occupies eight ($2^3$) entries in the lookup array. The entries in the lookup array corresponding to device characterization vectors 1320(0) to 1320(9) are non-intersecting. FIG. 17 illustrates device classifications (device types) corresponding to all values (192 values) of description vectors Θ (Table 1700). A mark "?" in FIG. 17 (and FIG. 18) indicates indefinite classification.

Figure 18:
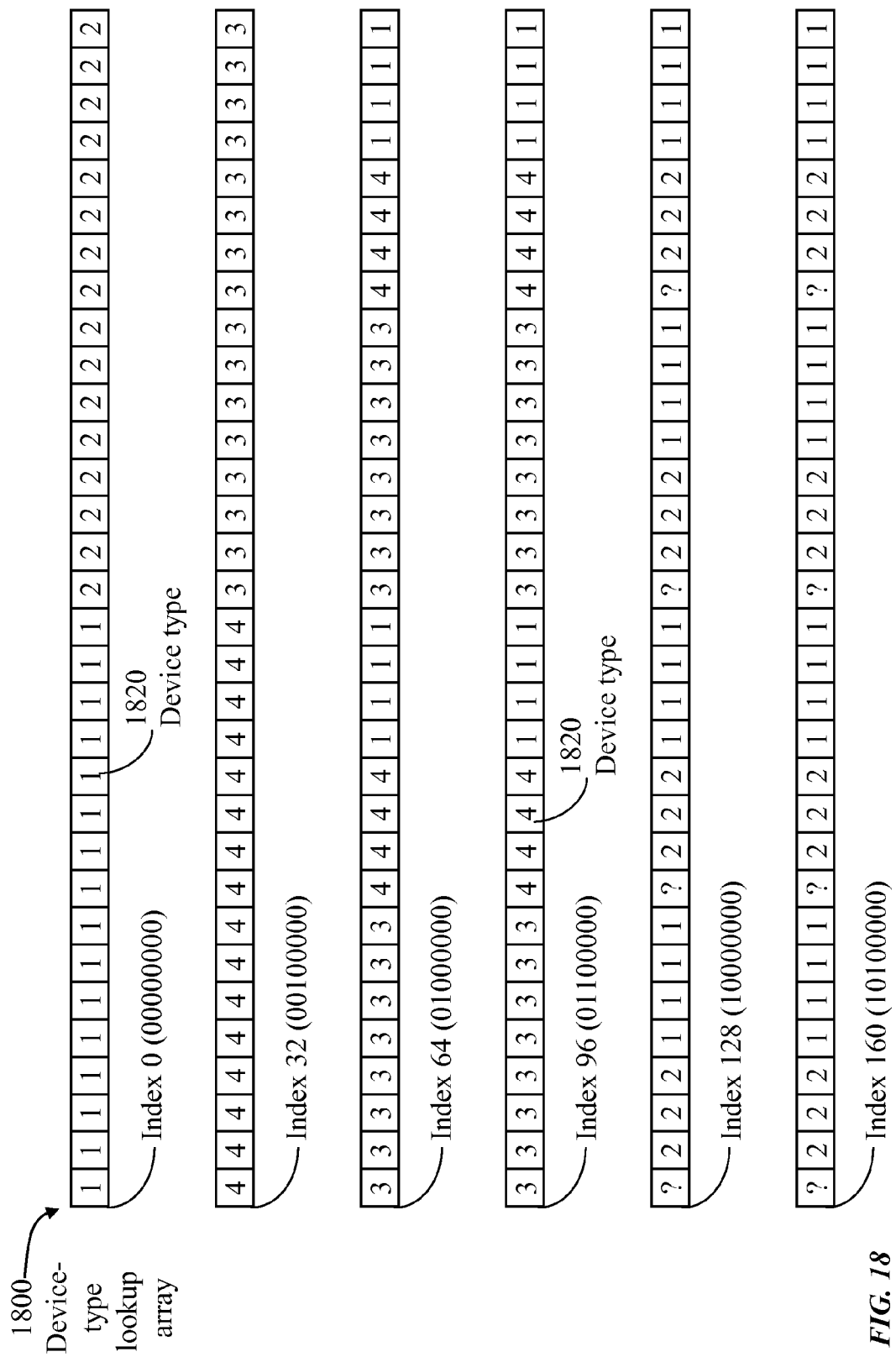
FIG. 18 illustrates an array of device classifications indexed by a value of a descriptor vector, in accordance with an embodiment of the present invention.

FIG. 18 illustrates a device-type lookup array 1800, denoted κ, indexed by a value (eight bits excluding "11" of the two most significant bits) of a description vector Θ as received from a device under consideration.

Figure 19:
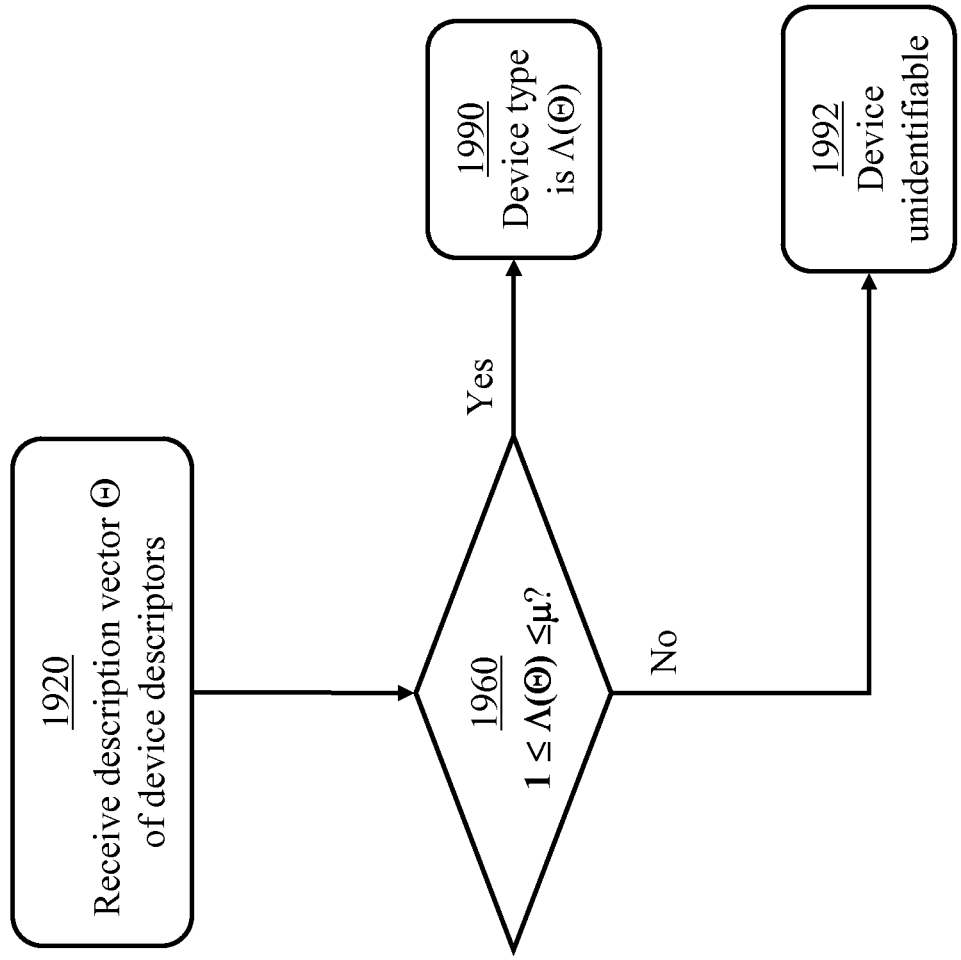
FIG. 19 illustrates a third method of device classification in accordance with an embodiment of the present invention.

FIG. 19 is a flow chart 1900 illustrating the third method of device classification. The received description vector Θ (step 1920) is used to index array κ (step 1960), and if the entry κ(Θ) has a value outside an acceptable range of 1 to μ, where μ>1 is four in the example of FIG. 13 (four device types indexed as 1 to 4), the description vector is considered incorrect and the device under consideration is considered unidentifiable (step 1992). If the entry κ(Θ) has a value within the range 1 to μ, the entry is considered an index of a device type.

Topology Deduction Process

Figure 20:
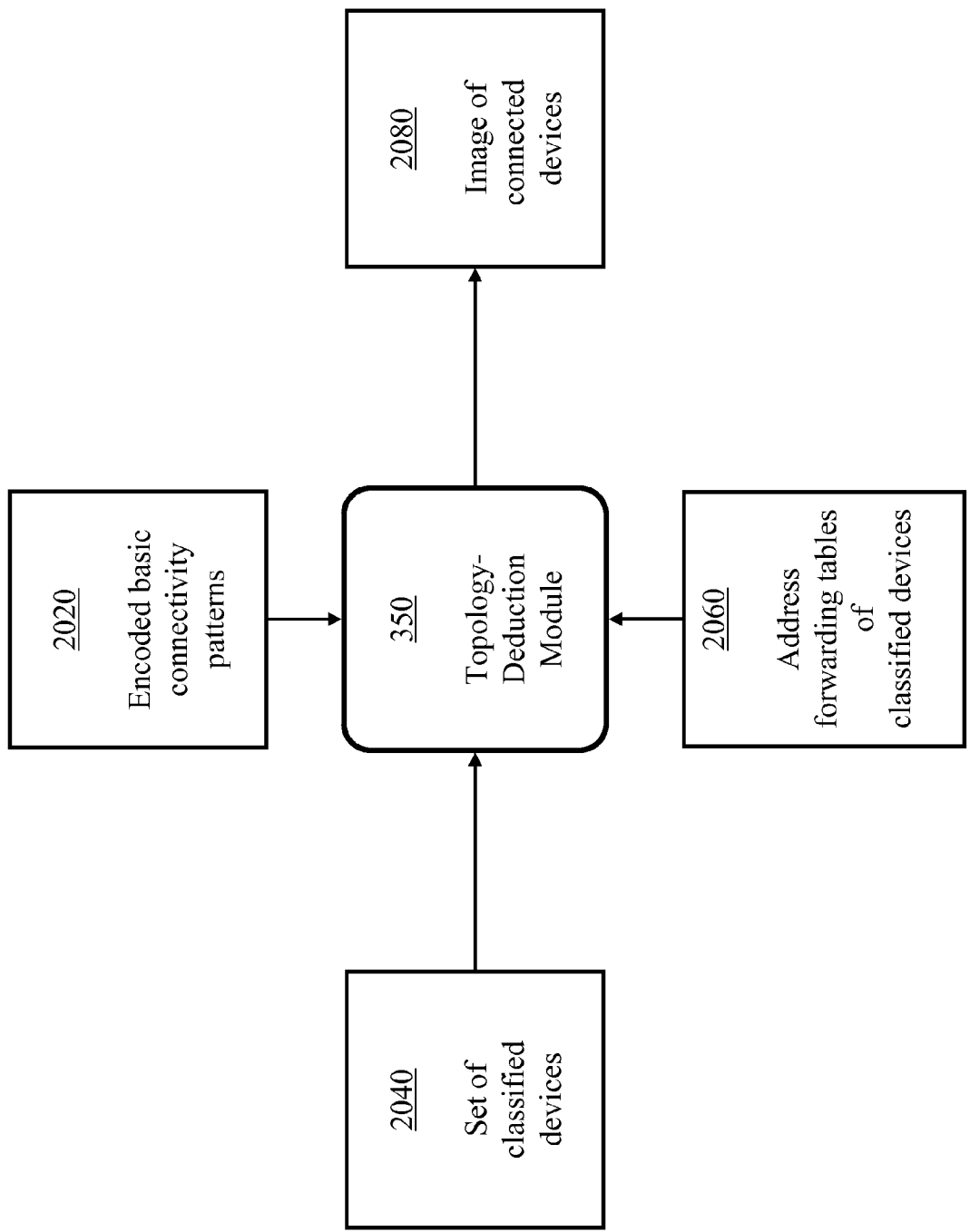
FIG. 20 illustrates an exemplary topology-deduction module 350 of FIG. 3 receiving encoded basic connectivity patterns, data indicating classifications of network devices, and address forwarding tables and producing an image of connected devices, in accordance with an embodiment of the present invention.

FIG. 20 illustrates an exemplary topology-deduction module 350 of FIG. 3 receiving encoded basic connectivity patterns (2020), data indicating classifications of network devices (2040), and address forwarding tables (2060). The topology-deduction module 350 implements a process to be described below with reference to FIG. 21 for determining an image (2080) of connected devices, i.e., deducing the topology of a network under consideration.

Figure 23:
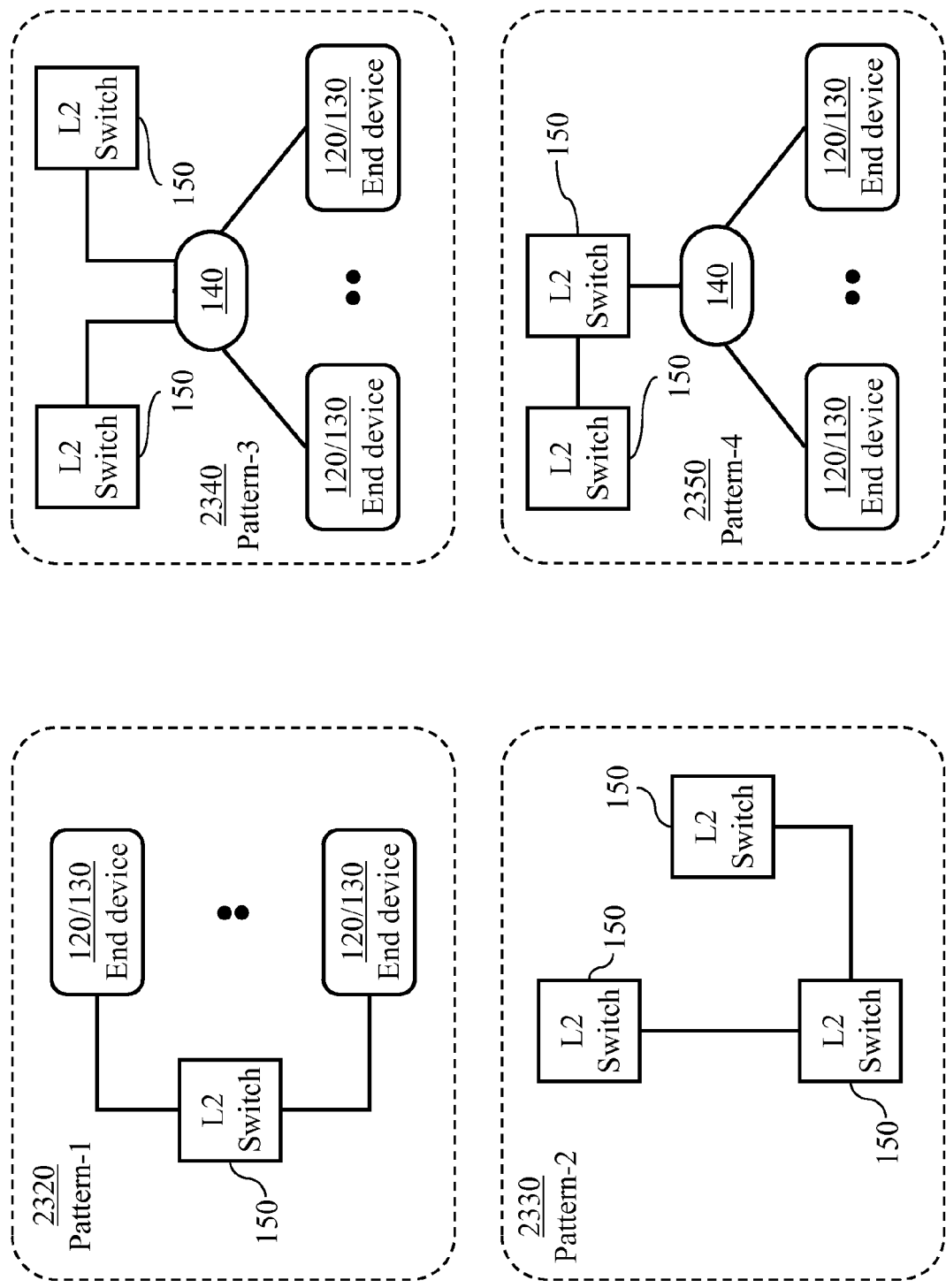
FIGS. 23 and 24 illustrate a set of connectivity patterns for use in the topology-deduction process of FIG. 21, in accordance with an embodiment of the present invention.
Figure 24:
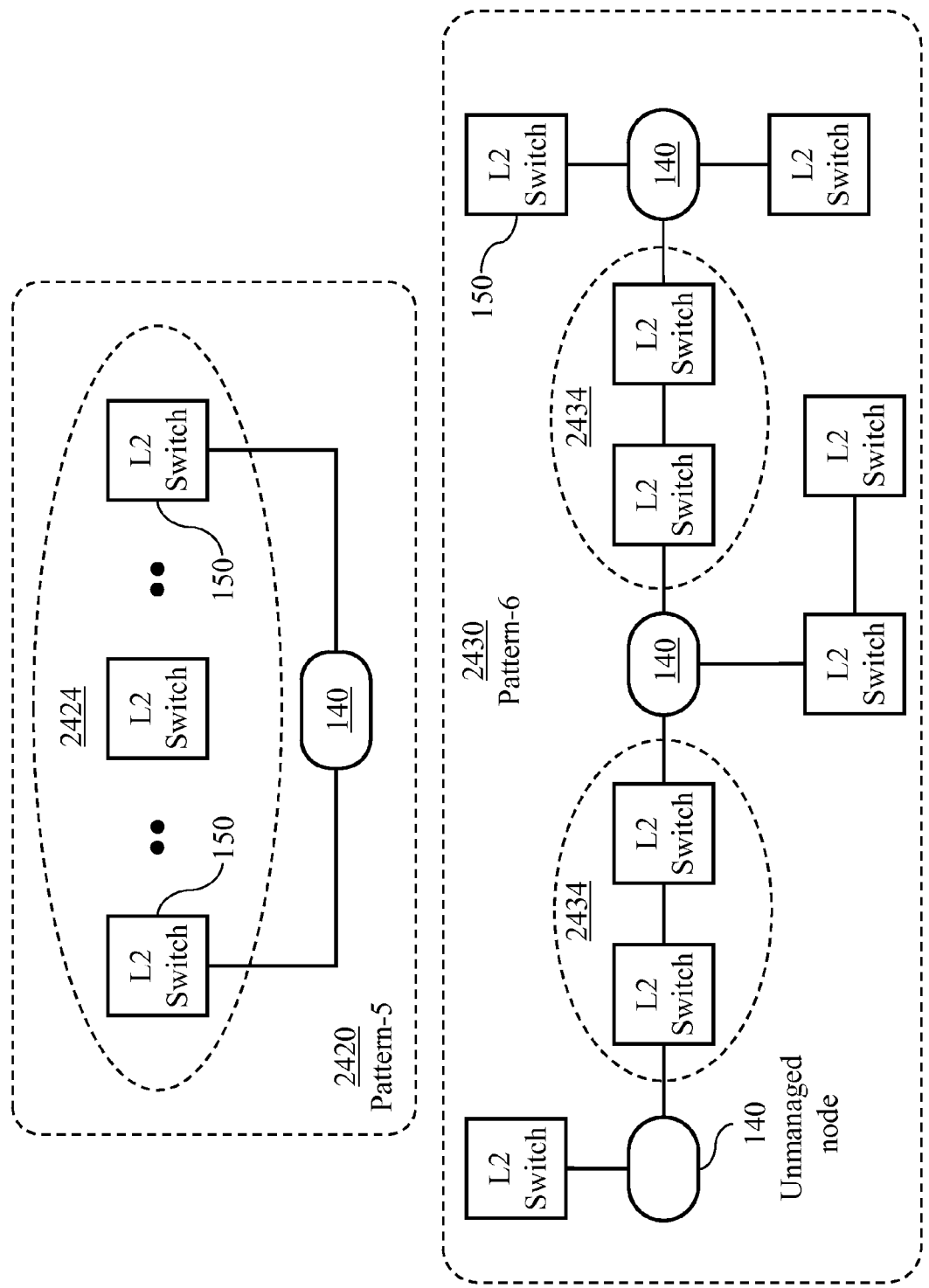
Figure 30:
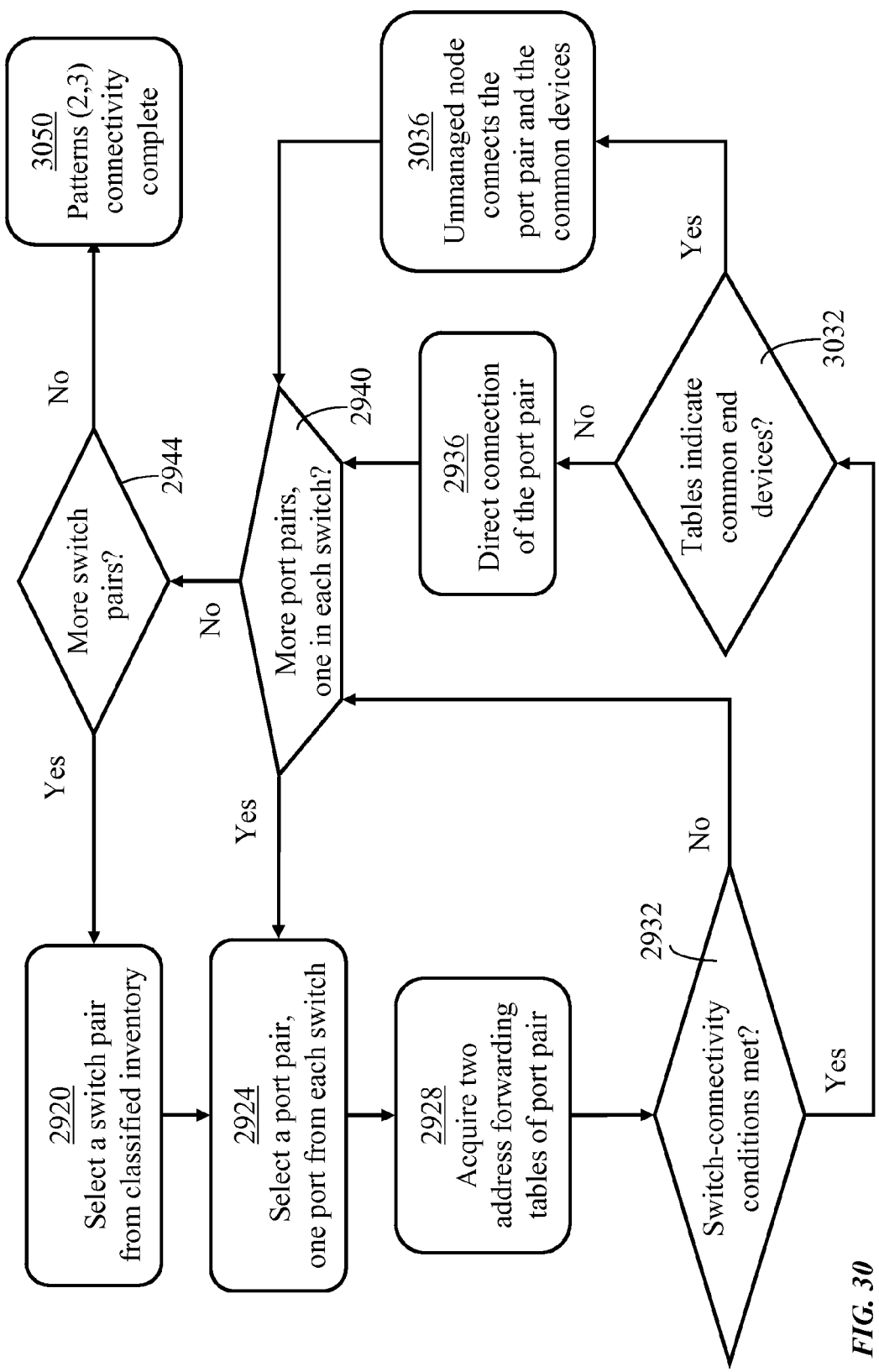
FIG. 30 illustrates a process of recognizing a third connectivity pattern in a network in accordance with an embodiment of the present invention.
Figure 31:
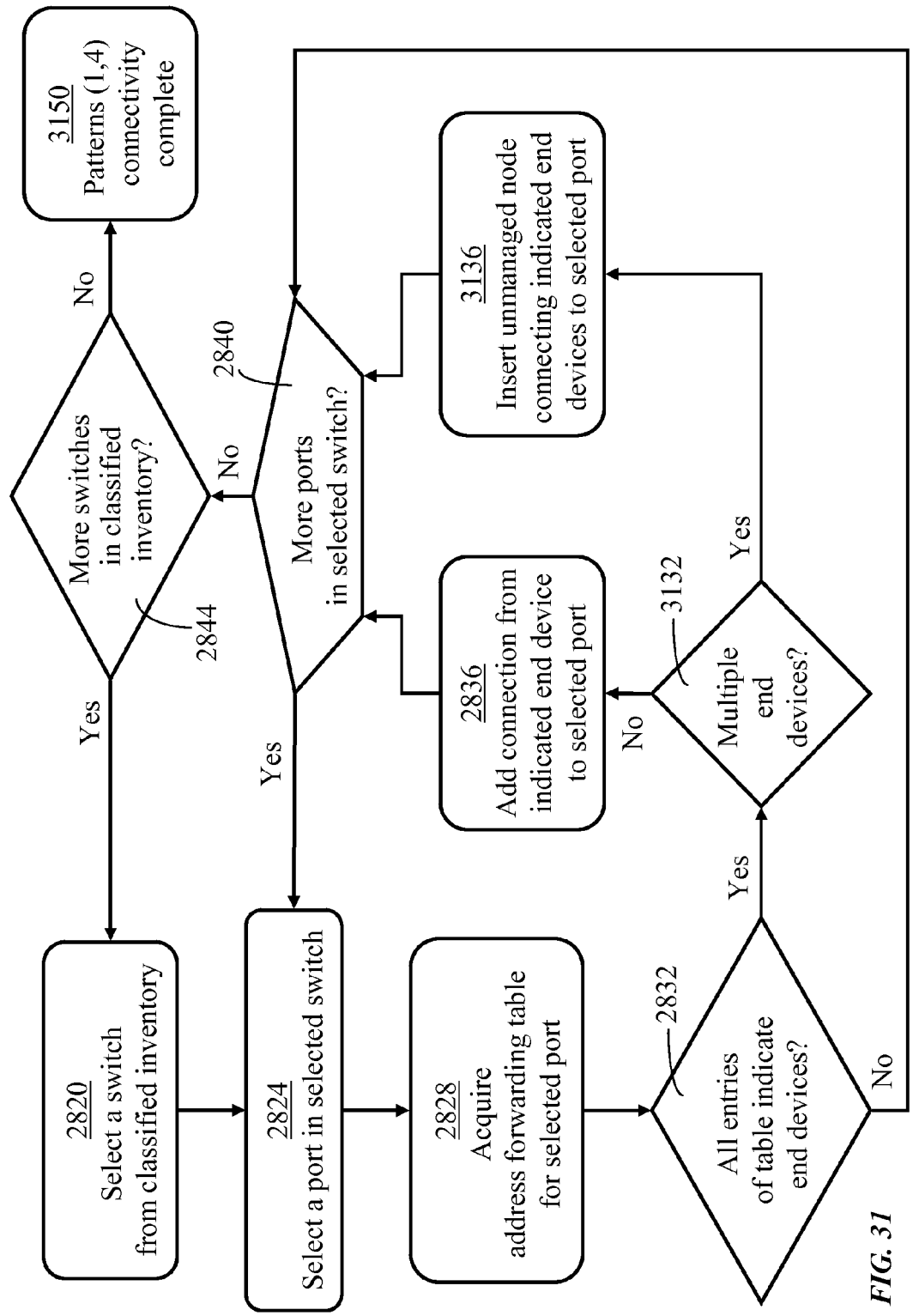
FIG. 31 illustrates a process of recognizing a fourth connectivity pattern in a network in accordance with an embodiment of the present invention.

Exemplary basic connectivity patterns, labeled pattern-1 to pattern-6 are illustrated in FIG. 23 and FIG. 24. Encoded pattern-1 and pattern-2 are illustrated in a flow-chart form in FIG. 28 and FIG. 29, respectively. Pattern-3 modifies connectivity deductions based on pattern-2 and pattern-4 modifies connectivity deductions based on pattern-1. FIG. 30 illustrates combined encoding, in the form of a flow chart, of pattern-2 and pattern-3. FIG. 31 illustrates combined encoding, in the form of a flow chart, of pattern-1 and pattern-4. All encoded patterns are presented to the topology-deduction module 350 in the form of executable instructions.

Figure 21:
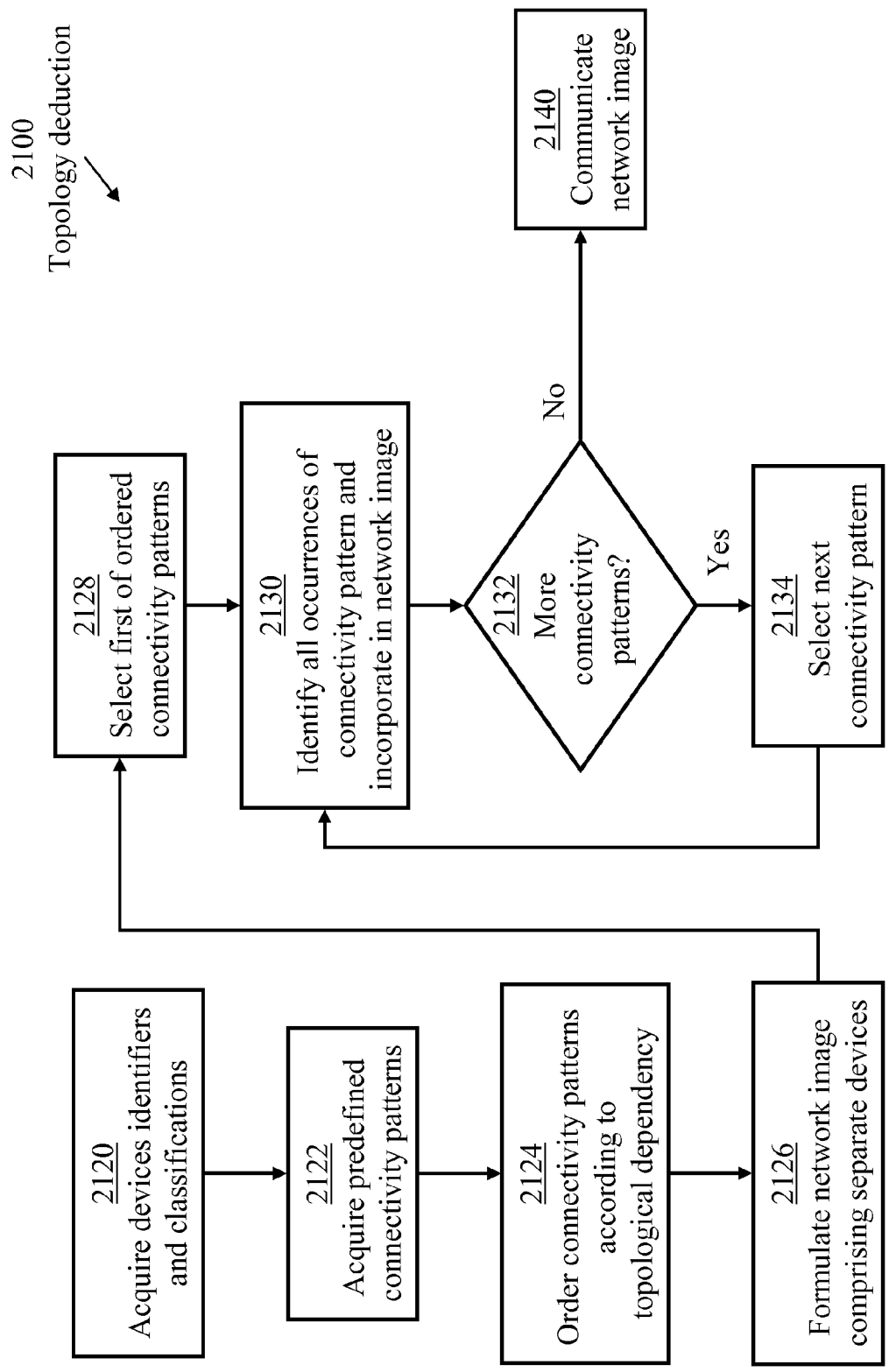
FIG. 21 illustrates a topology-deduction process based on recognition of basic connectivity patterns in accordance with an embodiment of the present invention.

FIG. 21 illustrates an exemplary topology-deduction process 2100 based on recognition of basic connectivity patterns. The device identification and classification module 340 identifies and classify network devices as described above with reference to FIG. 5, FIG. 12, FIG. 16, and FIG. 19. In step 2120, device identifiers and classifications are acquired from module 340. In step 2122, encoded basic connectivity patterns (2020, FIG. 20) are acquired from a storage medium or according to some other means. In step 2124, the encoded connectivity patterns are sorted according to topological dependency so that a connectivity pattern depends on preceding connectivity patterns, if any, and is independent of succeeding connectivity patterns, if any. In step 2126, a network image comprising all identified devices is formed, where none of the devices is connected to any other device. In step 2128, an independent connectivity pattern is selected and in step 2130 all occurrences of the selected connectivity pattern are identified and incorporated in the network image. Step 2132 determines whether all connectivity patterns have been considered. Step 2134 selects a subsequent connectivity pattern to be considered in step 2130. When step 2132 determines that all connectivity patterns have been considered, the network image synthesized so far is presented (step 2140) to a user of network appliance 190. If the network image contains unconnected device after incorporating all predefined connectivity patterns, conjectured connections may be inferred as will be described with reference to FIG. 25.

Figure 22:
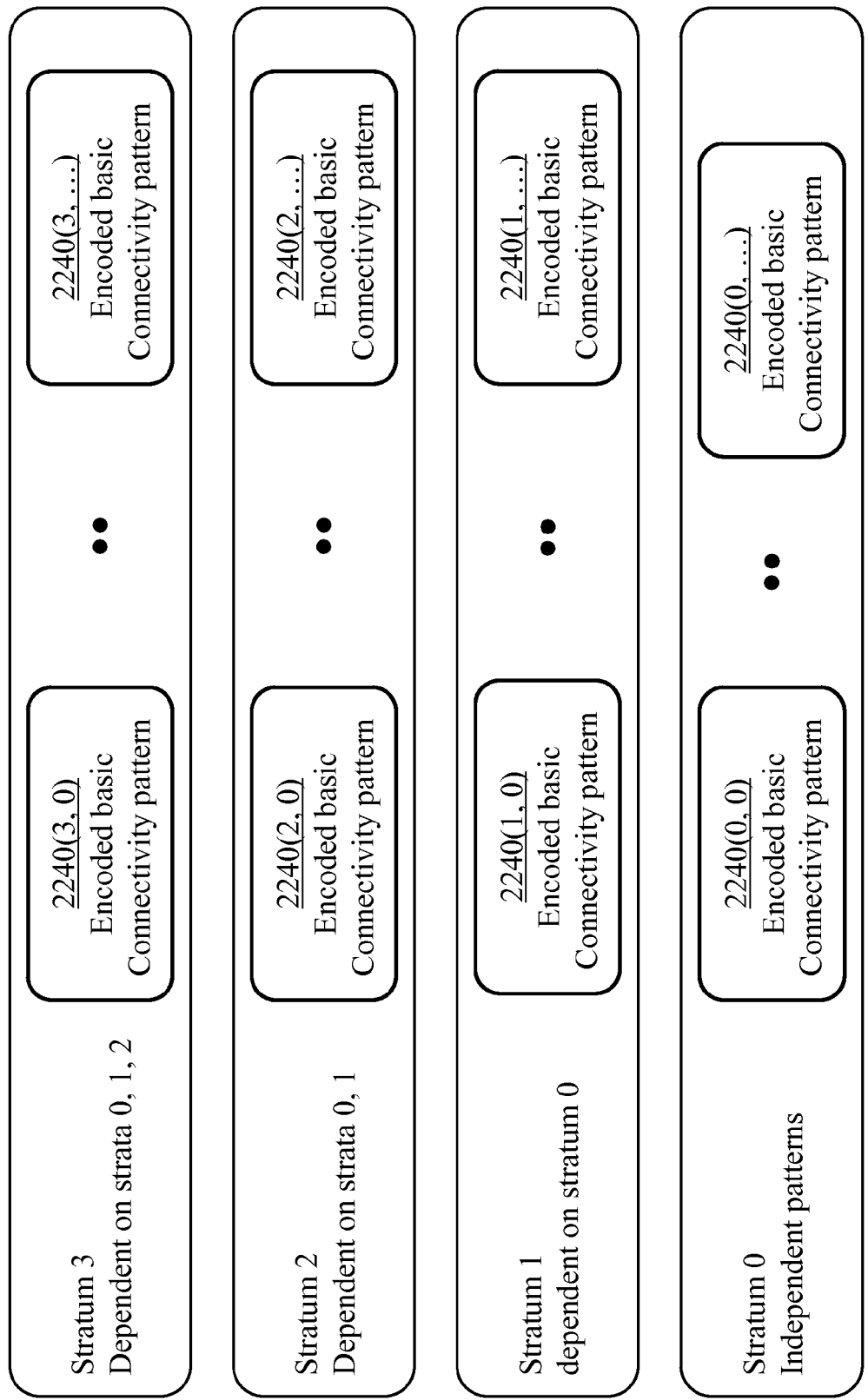
FIG. 22 illustrates topological dependencies of basic connectivity patterns.

FIG. 22 illustrates topological dependencies of basic connectivity patterns. The connectivity patterns are arranged in several strata with the patterns of each stratum being independent from each other and from patterns of succeeding strata, if any. For example, a stratum-j, 0≦j<4, comprises patterns 2240(j, 0), 2240(j, 1), etc. The pattern recognition process (2130, FIG. 21) may start with any of independent patterns 2240(0,0), 2240(0,1), etc., of stratum 0. When all patterns of stratum 0 are considered, the patterns 2240(1,0), 2240(1, 1), etc., of stratum 1 may be considered in any order, and so on.

FIG. 23 and FIG. 24 illustrate a set of connectivity patterns for use in the topology-deduction process of FIG. 21. Pattern-1 (2320, FIG. 23) covers end devices directly connected to a switch. Pattern-2 (2330, FIG. 23) covers directly connected switches. Pattern-3 (2340, FIG. 23) covers an unmanaged node connecting switches where the unmanaged node has subtending end devices. Pattern 4 (2350, FIG. 23) covers unmanaged nodes connecting edge devices. Pattern 5 (2420, FIG. 24) represents an unmanaged node connecting multiple switches. Pattern 6 represents a generic case where unmanaged nodes can be anywhere in a network with multiple unmanaged nodes, with each unmanaged node connecting more than two switches.

Process of Placing Unmapped Devices

Figure 25:
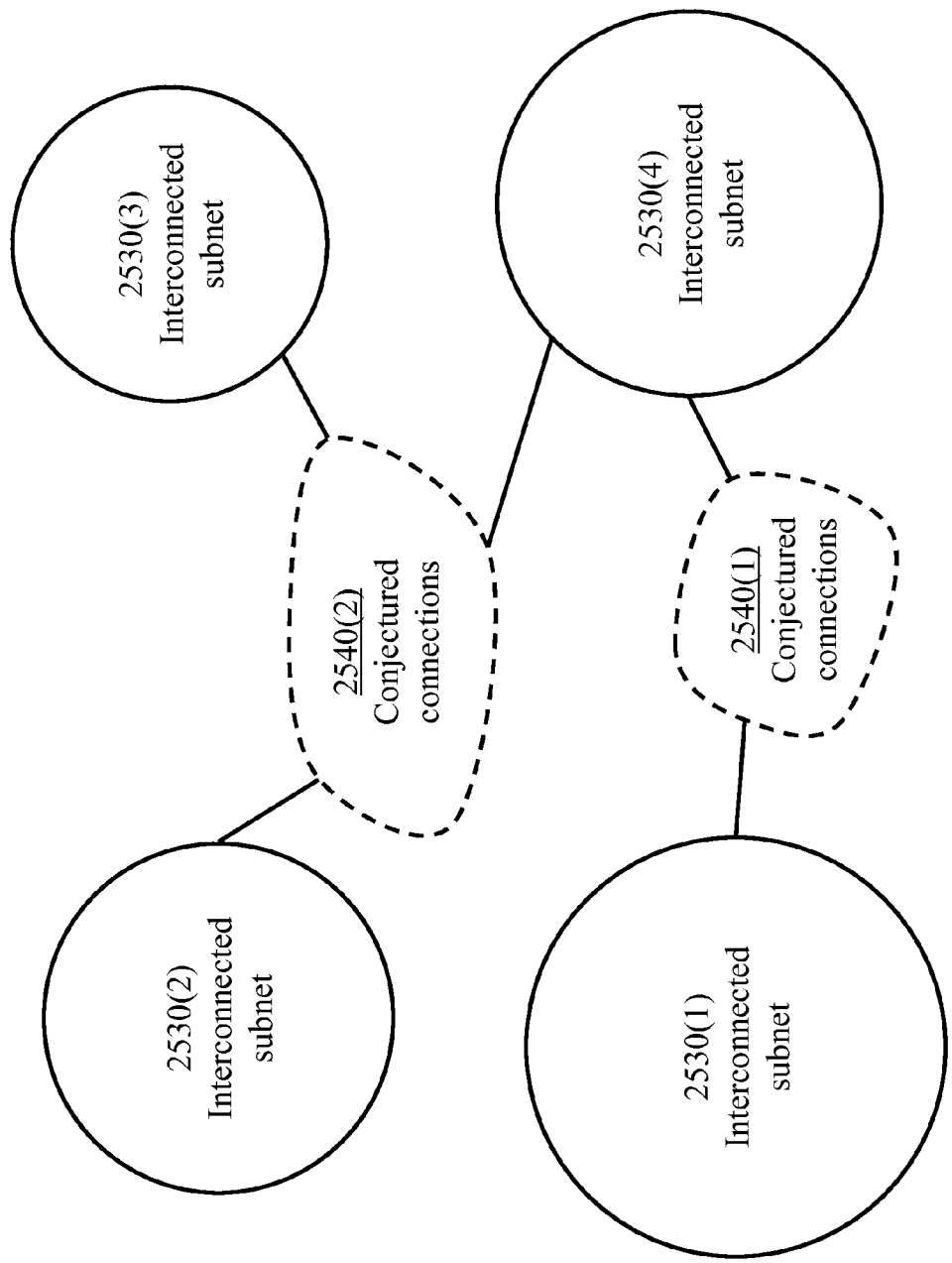
FIG. 25 illustrates conjectured connections, in accordance with an embodiment of the present invention, of devices whose connectivity remain unknown after completion of the topology-deduction process of FIG. 21.

FIG. 25 illustrates conjectured connections 2540(1), 2540(2) of devices the connectivity of which cannot be determined in the topology-deduction process of FIG. 21. After completion of recognizing patterns 1 to 6, the network image may include interconnected subnets and some devices of the inventory of identified and classified network devices may not be incorporated into the network image. FIG. 25 illustrates four interconnected subnets 2530(1), 2530(2), 2530(3), 2530(4). A device that is not connected to any other device is herein called an "unmapped device". An unmapped device can be a switch or an end system. Failure to determine connection of a device may occur due to incomplete address-forwarding tables or even absence of an address-forwarding table at some switches. In the absence of complete information, placing of unconnected switches may be based on conjectures. For example, a switch port and a host can be connected to a "cloud of devices" (a conjectured connection), but the interface identifier of the switch port may not be known.

Figure 26:
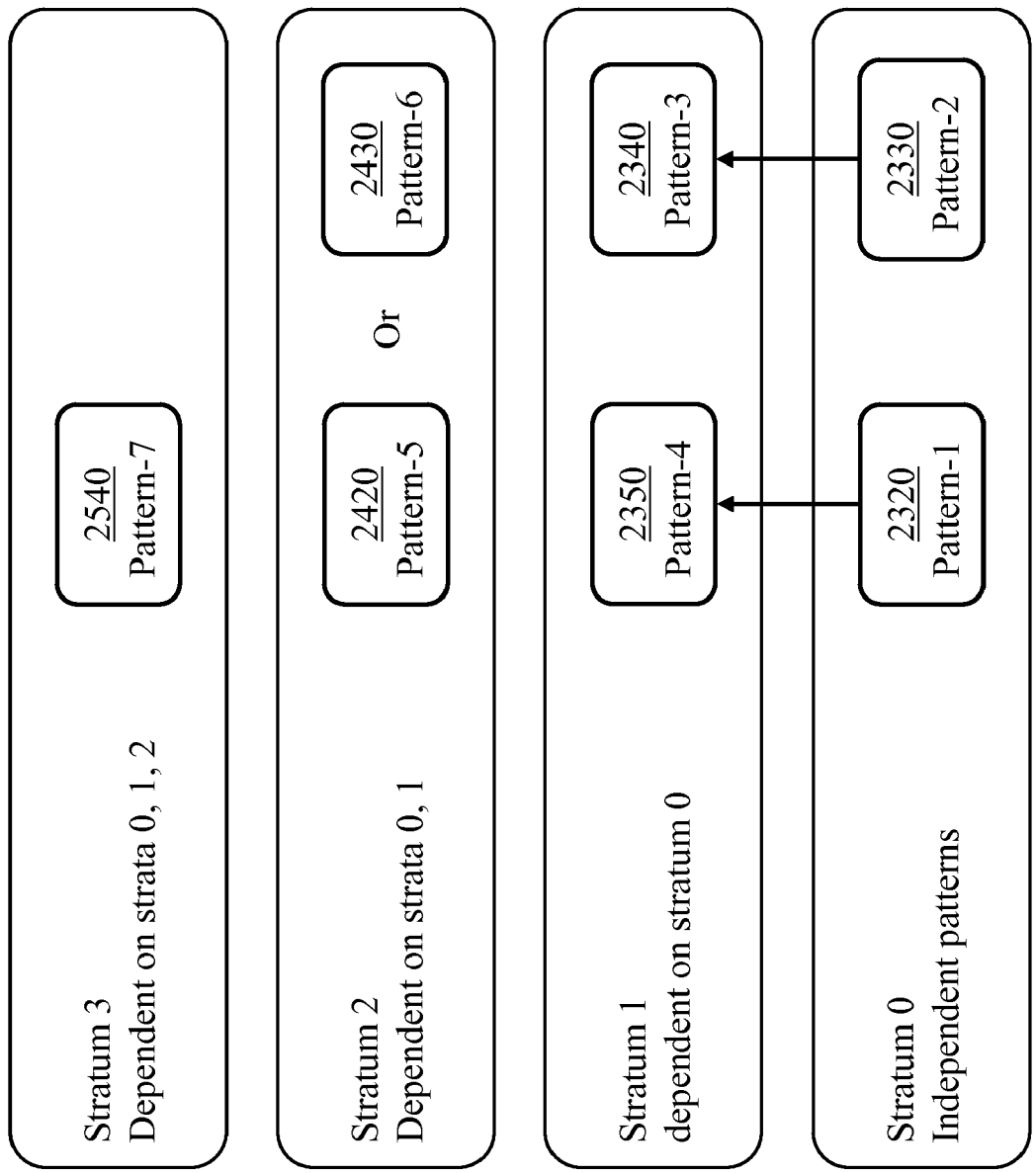
FIG. 26 illustrates topological dependencies of the connectivity patterns of FIG. 23 and FIG. 24.

FIG. 26 illustrates topological dependencies of the connectivity patterns of FIG. 23 and FIG. 24. Stratum 0 comprises independent pattern-1 and pattern-2. Stratum 1 comprises pattern-3, which complements pattern-2, and pattern-4, which complements pattern-1. Stratum 2 comprises pattern-5 or pattern-6. Pattern-6 is a generalization of pattern-5 and, therefore, pattern-5 may be considered redundant. However, recognition of occurrences of pattern 5 is significantly simpler. Stratum 3 comprises a process of forming conjectured connections, if needed, which is implemented after all patterns are considered. Conjectured connections are labeled as "pattern-7" in FIG. 26 and FIG. 27.

Figure 27:
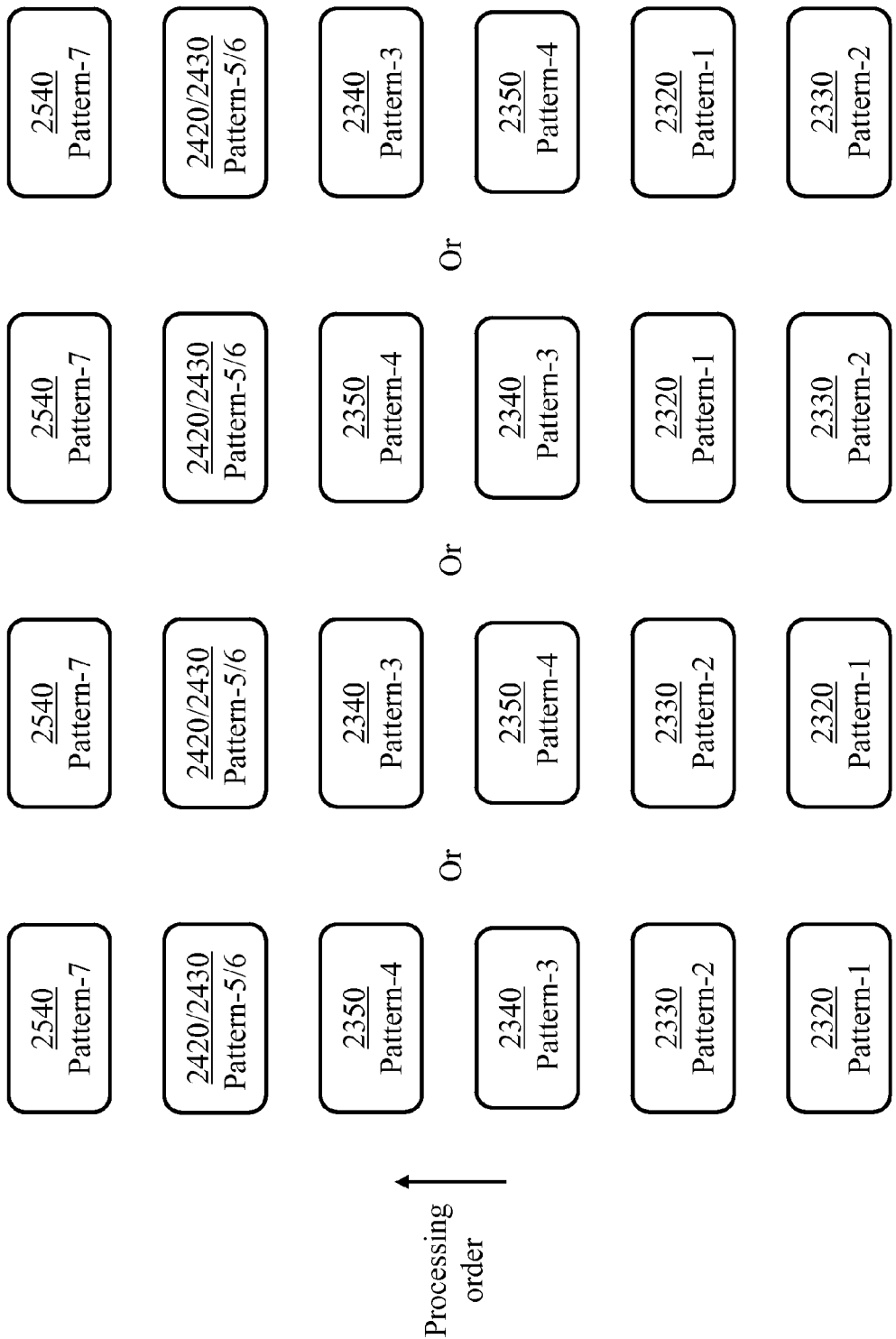
FIG. 27 illustrates alternative sequences of considering the connectivity patterns of FIGS. 21 and 22 in the topology-deduction process of FIG. 21.

FIG. 27 illustrates alternative sequences of considering the connectivity patterns of FIGS. 21 and 22 in the topology-deduction process of FIG. 21. For example, the second sequential order processes pattern-4 before pattern-3 and the fourth sequential order processes pattern-2 before pattern-1.

Figure 28:
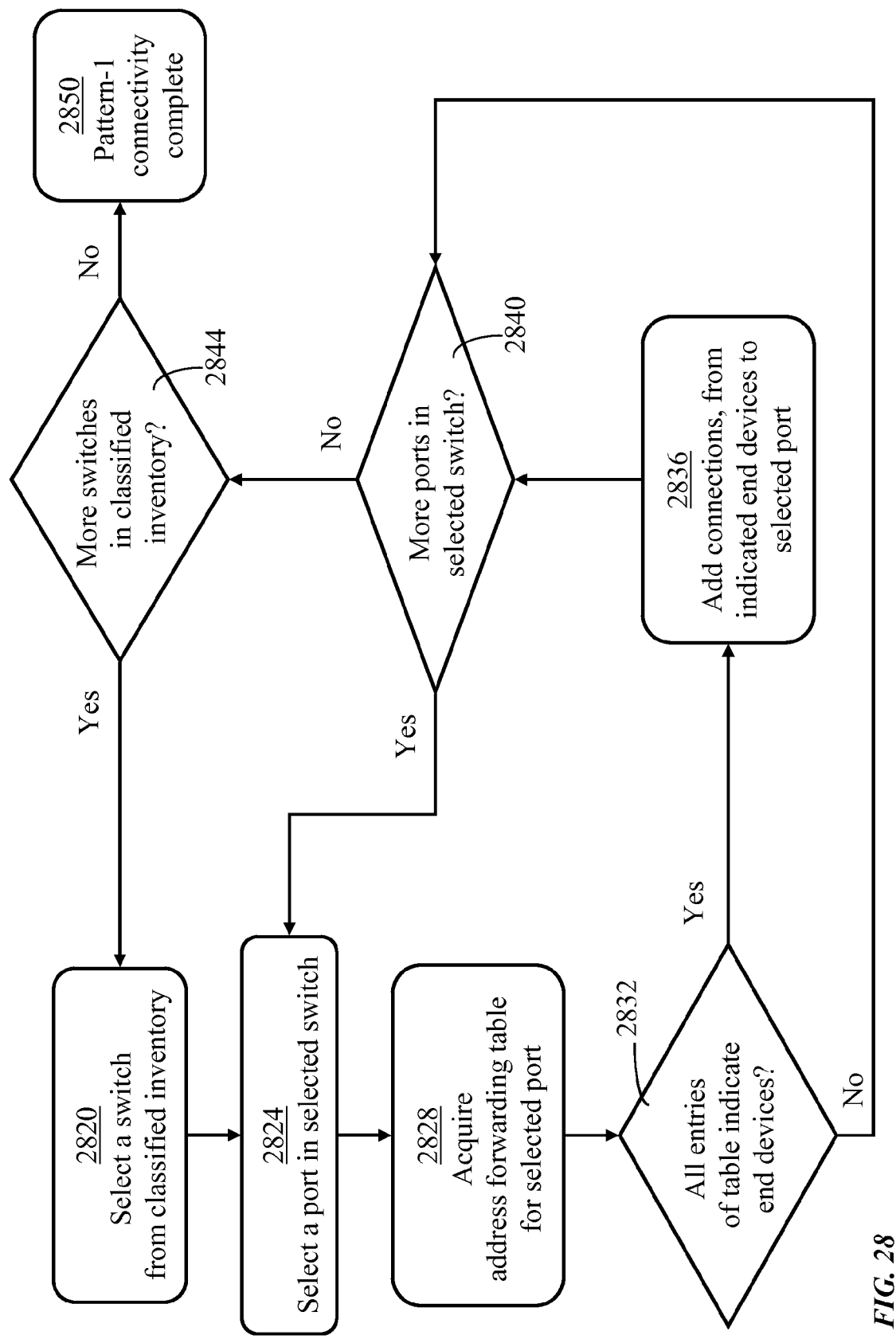
FIG. 28 illustrates a process of recognizing a first connectivity pattern in a network in accordance with an embodiment of the present invention.

FIG. 28 illustrates a process of recognizing a first connectivity pattern, pattern-1, in a network. In step 2820, a switch is selected from among the inventory of devices. In step 2824, one of the ports of the selected switch is selected. In step 2828, an address forwarding table of the selected port is acquired and if all entries of the address-forwarding table correspond to end devices (step 2832), connections from the end devices to the selected ports are established in step 2836, leading to step 2840. Otherwise, step 2840 follows step 2832. If step 2840 determines that more ports of the same selected switch are yet to be considered, step 2824 selects a new port of the same selected switch and steps 2832, 2836, and 2840 are repeated.

If step 2840 determines that all ports of the switch selected in step 2820 have been considered and if step 2844 determines that more switches in the device inventory are yet to be considered, step 2820 is revisited to select another switch. When all switches are considered, all occurrences of pattern-1 connectivity would be indicated in the network image.

Figure 29:
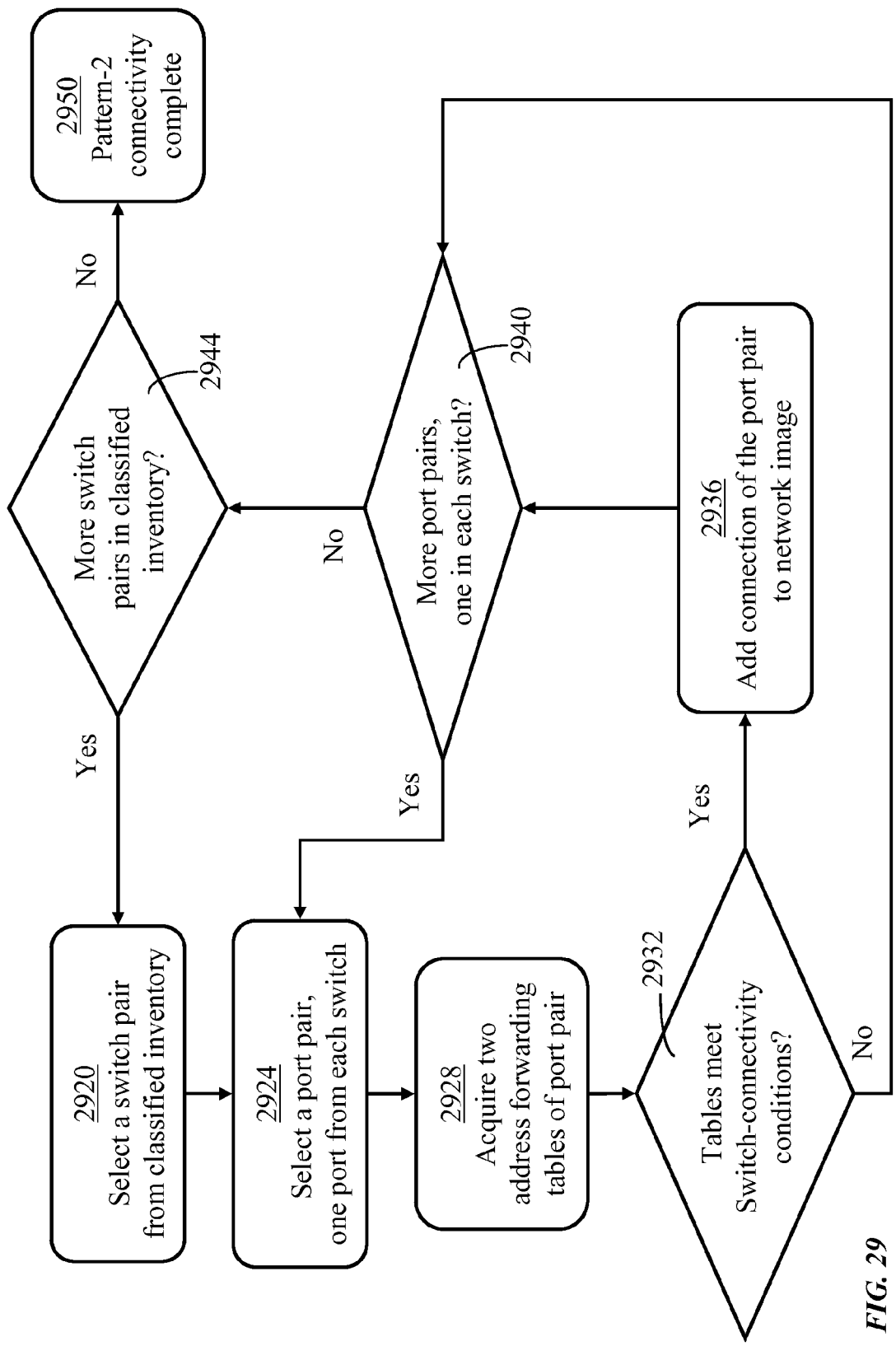
FIG. 29 illustrates a process of recognizing a second connectivity pattern in a network in accordance with an embodiment of the present invention.

FIG. 29 illustrates a process of recognizing a second connectivity pattern, pattern-2, in a network. In step 2920, a switch pair is selected from among the inventory of devices. In step 2924, a port pair, including one port from each of the two selected switches, is selected. In step 2928, two address-forwarding tables of the two ports of the selected port pair are acquired. If the intersection of the two address-forwarding tables does not include a switch and if the union of the two-address forwarding tables corresponds to the union of all devices, a connection of the selected port pair is considered to exist and the network image is marked accordingly (step 2936). Step 2940 either selects another port pair or directs the process to step 2944 which either selects another switch pair or terminate the process.

Pattern-3 deduces interconnection of switches through an unmanaged node. Incorporating pattern-3 connectivity modifies connections resulting from incorporating pattern-2 connectivity. FIG. 30 illustrates a process of recognizing both pattern-2 and pattern-3 connectivity patterns. Steps 2920, 2924, 2928, 2932, 2936, 2940, and 2944 are common in FIG. 29 and FIG. 30. In both FIG. 29 and FIG. 30, when step 2932 determines that a switch pair is not interconnected, step 2940 follows to consider another port pair, if any. When step 2932 in FIG. 29 determines that a switch pair is interconnected, step 2936 follows and a direct connection is established in the build-up of the network image. When step 2932 in FIG. 30 determines that a switch pair is interconnected, step 3032 follows to determine whether the two switches of the switch pair under consideration are connected through an unmanaged node supporting end devices (pattern-3). If so, step 3036 includes the unmanaged node and end devices in the network image and step 2940 follows. Otherwise, if step 3032 determines that the two switches are directly connected without an intervening unmanaged node, step 2936 includes the direct connection in the network image and step 2940 follows. Step 2944 determines whether to consider another switch pair (step 2920) or terminate the process (step 3050) with all pattern-2 and pattern-3 connectivity patterns indicated in the network image.

Pattern-4 deduces unmanaged nodes connecting end devices. Incorporating pattern-4 connectivity modifies connections resulting from incorporating pattern-1 connectivity. FIG. 31 illustrates a process of recognizing both pattern-1 and pattern-4 connectivity patterns. Steps 2820, 2824, 2828, 2832, 2836, 2840, and 2844 are common in FIG. 28 and FIG. 31. In both FIG. 28 and FIG. 31, when step 2832 detects a selected port connect to end devices, step 2840 follows to consider another port, if any. When step 2832 in FIG. 28 determines that a selected port connects to end devices, step 2836 follows and connections from the end devices to the selected port are established in the build-up of the network image. When step 2832 in FIG. 31 determines that a selected port connects to end devices, step 3132 follows to determine whether an unmanaged node connects the end devices to the selected port (pattern-4). If so, step 3136 includes the unmanaged node and end devices in the network image and step 2840 follows. Otherwise, if step 3132 determines that an end device is directly connected to the selected port without traversing an unmanaged node, step 2836 includes a respective connection in the network image and step 2840 follows. Step 2844 determines whether to consider another switch (step 2820) or terminate the process (step 3150) with all pattern-1 and pattern-4 connectivity patterns indicated in the network image.

Exemplary Network

Figure 32:
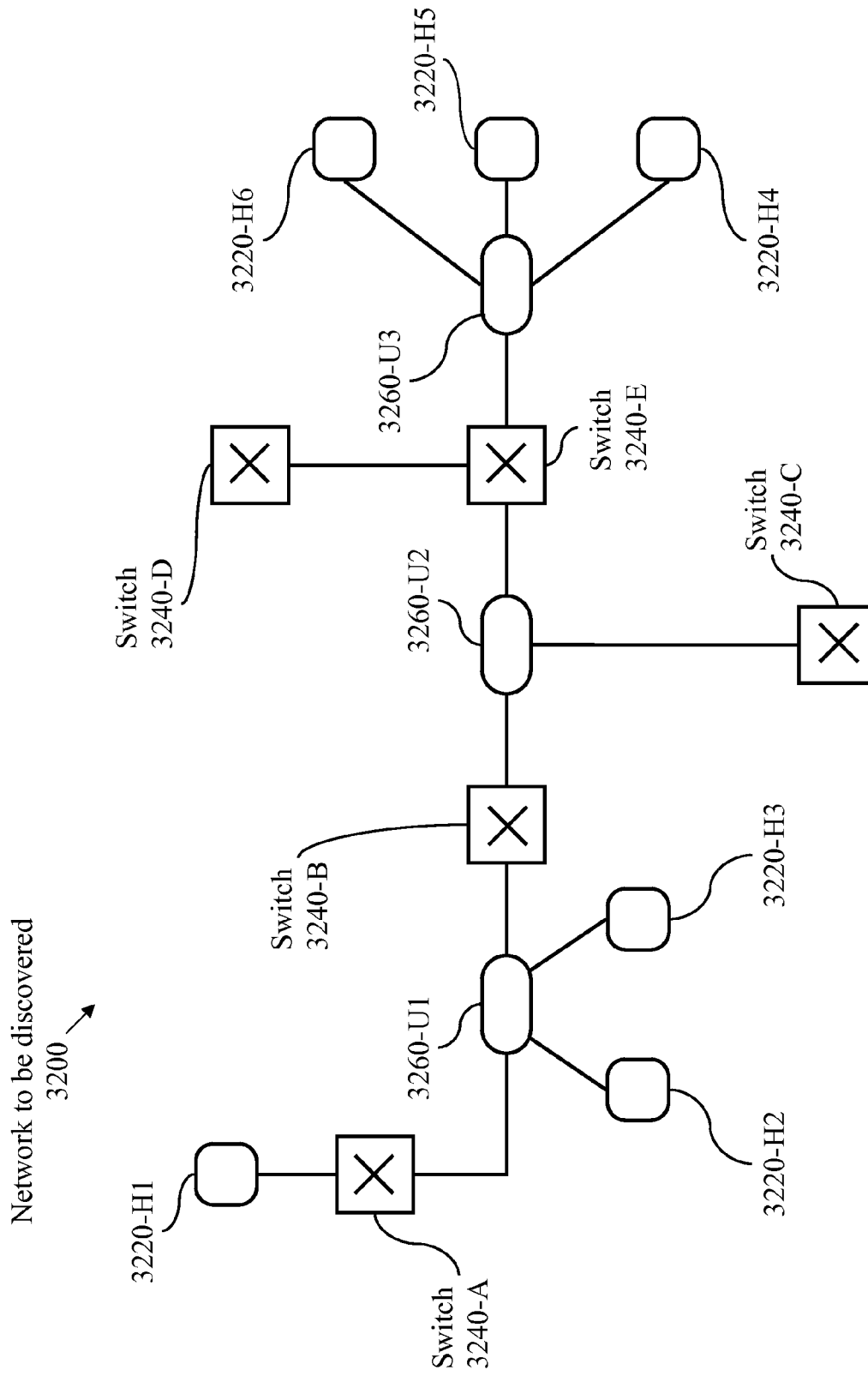
FIG. 32 illustrates an exemplary network for use in illustrating the topology-deduction process of FIG. 21.

The topology deduction process is illustrated using the exemplary network 3200 of FIG. 32. The network comprises 14 devices including end devices 3220-H1, 3220-H2, 3220-H3, 3220-H4, 3220-H5, and 3220-H6, switches 3240-A, 3240-B, 3240-C, 3240-D, and 3240-E, and unmanaged nodes 3260-U1, 3260-U2, and 3260-U3. As described with reference to FIG. 19, the process of topology deduction starts with a network image comprising separate devices as determined in the classified inventory. The network image is constructed according to the following steps: (1) directly connect end devices, (2) identify directly connected switches, (3) identify end devices between switches where the switches are connected through unmanaged nodes, (4) detect unmanaged nodes connecting end devices, (5) detect hubs between switches, (6) detect hubs in the middle of the network, and place unmapped devices, if any. The steps incorporate the connectivity patterns described above in a network image.

Figure 33:
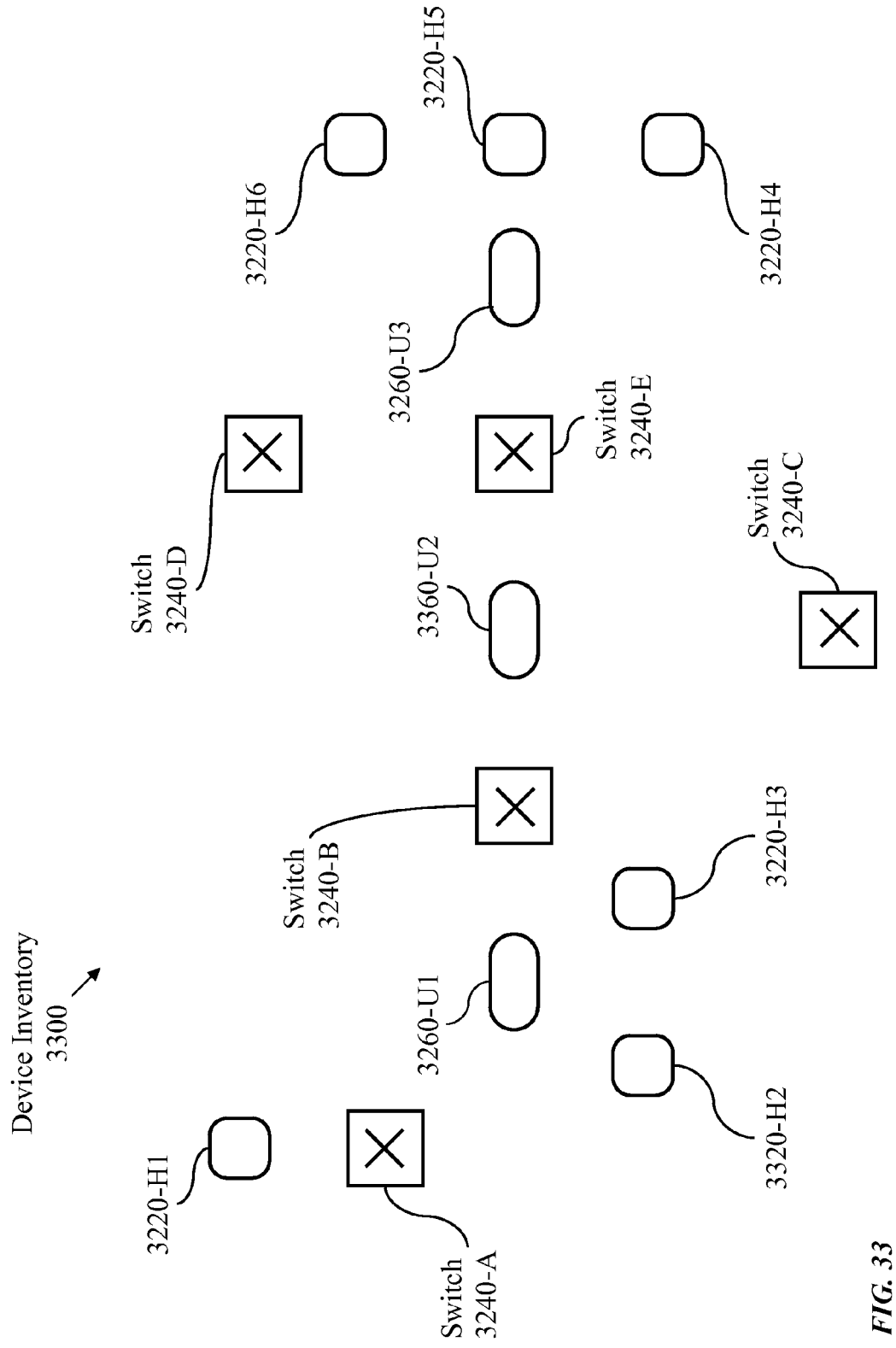
FIG. 33 illustrate classified inventory of devices of the exemplary network of FIG. 32.

FIG. 33 illustrates an initial network image 3300 including the device inventory determined in steps 420 and 430 (FIG. 4) where the devices are not interconnected.

Figure 34:
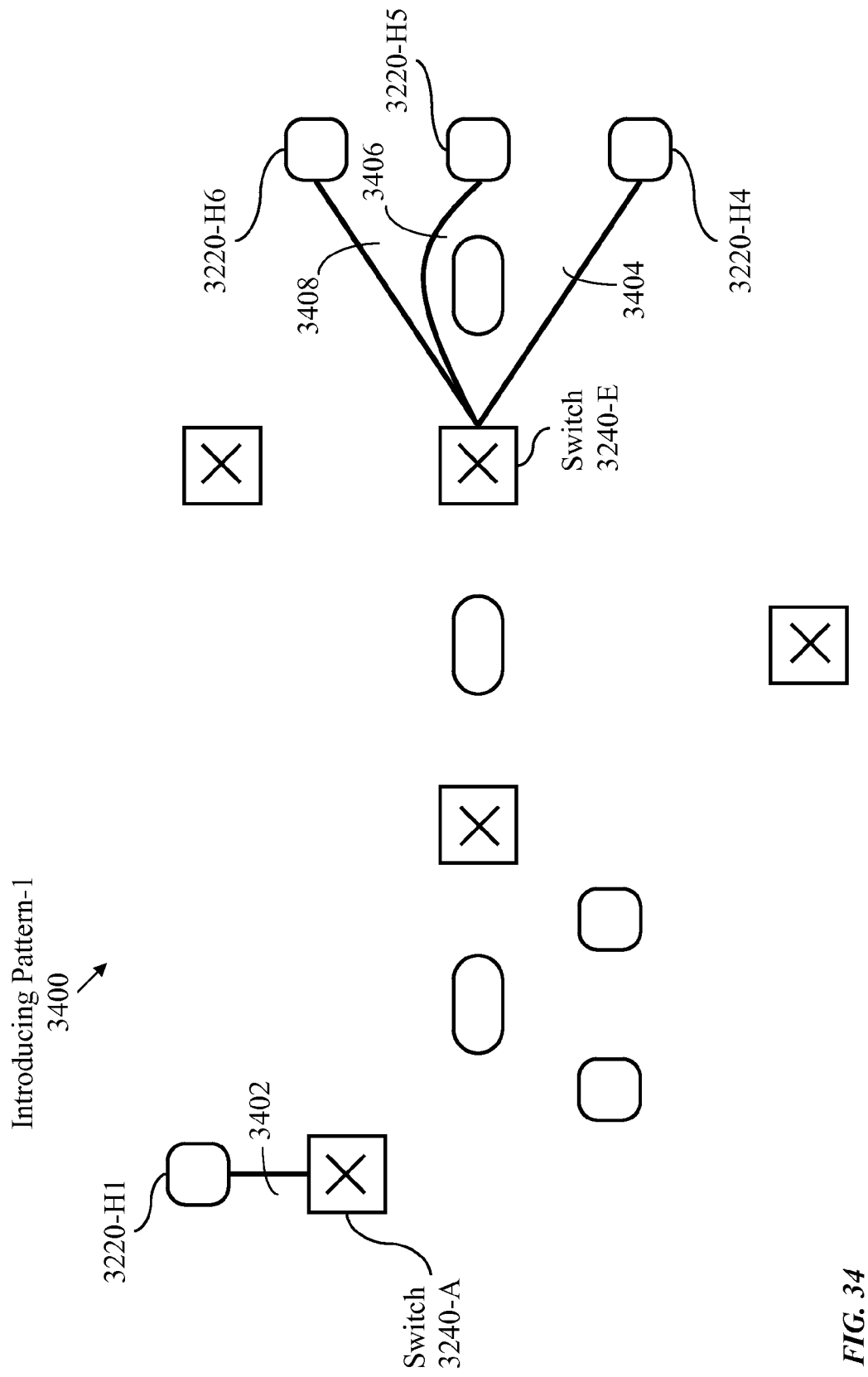
FIG. 34 illustrates partial connectivity of the classified inventory of FIG. 29 after incorporating the first connectivity pattern of FIG. 28 in accordance with the topology-deduction process of FIG. 21.

FIG. 34 illustrates detection of pattern-1 in the network image of FIG. 33. Pattern-1 (2320, FIG. 23) relates to end devices directly connected to a switch. Connecting end devices is achieved by checking a port's address forwarding entries. If all entries on a port belong to end-devices, as confirmed by matching the AFT entries with the ARP table and the Classification Table, then, the switch can be connected to each of those end devices. After completion of pattern-1 detection, end device 3320-H1 directly connects to switch 3240-A (connection 3402) and end devices 3220-H4, 3220-H5, and 3220-H6 directly connect to switch 3240-E (connections 3402, 3406, and 3408, respectively) to form network image 3400.

Figure 35:
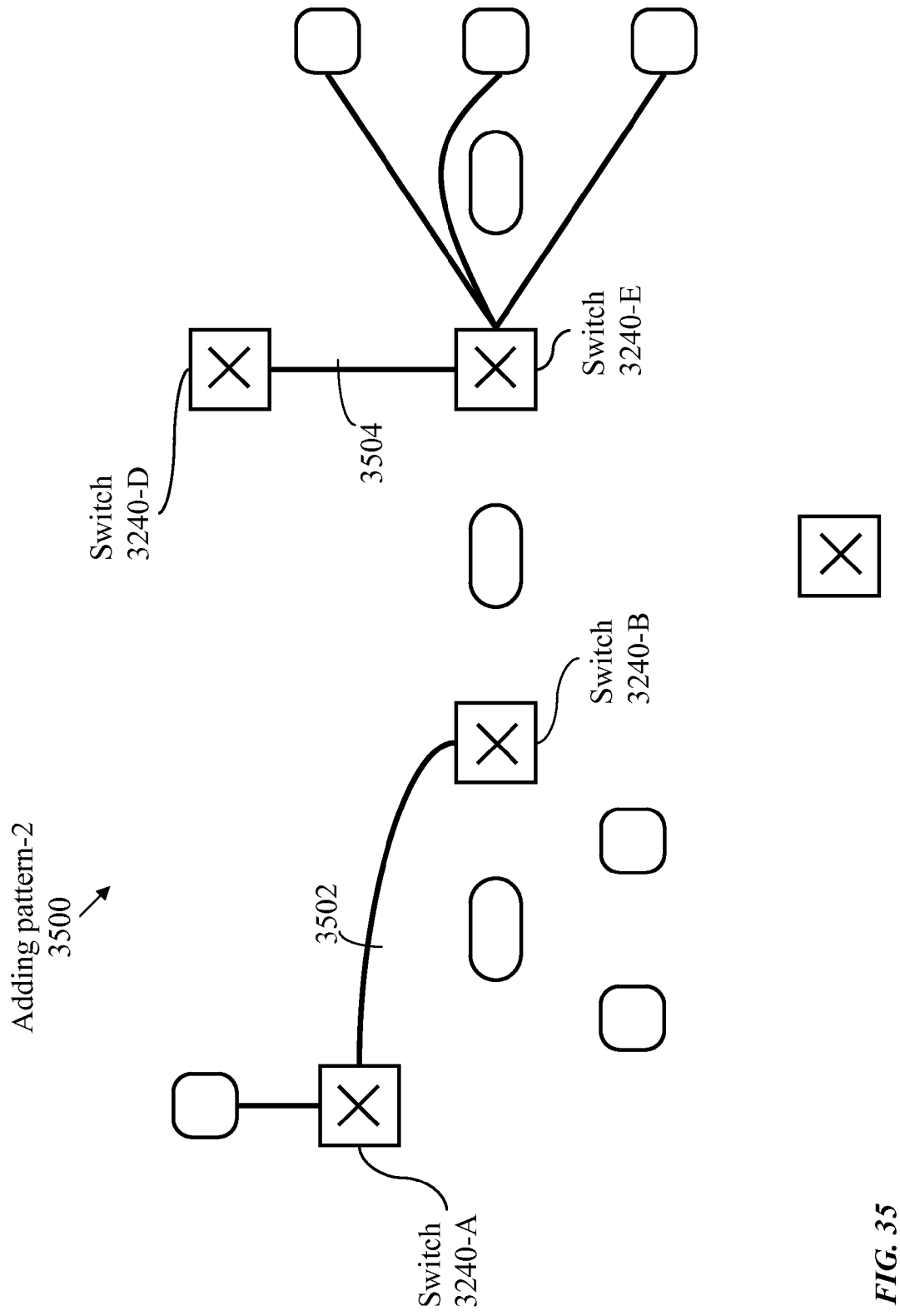
FIG. 35 illustrates network connectivity after incorporating the second connectivity pattern of FIG. 29 in accordance with the topology-deduction process of FIG. 21.

FIG. 35 illustrates detection of pattern-2 in the network image of FIG. 34. Pattern-2 (2330, FIG. 23) relates to directly connected switches. To identify directly connected switches, i.e., to identify all those links for which there is only a switch on either side. An "allMACs" list, including all the management MAC addresses in the Network under consideration, is constructed.

The allMACs list is built by examining the address forwarding tables of each device. Entries corresponding to end devices are removed from allMACs list. After data refinement and validation, the list contains only management MAC addresses of switches and routers and is used to determine direct connectivity of switches.

Direct connectivity between switches is preferably determined using a known direct-connection theorem, which states that if two ports belonging to different switches are directly connected, the address forwarding tables of the two ports will have no common AFT entries and the union of the two ports' AFT will be the complete set of entries. The theorem is applied using only management MAC addresses i.e., the union set comprises management MACs of all switches in the network under consideration. The union of the AFTs for the 2 ports on either end of a link will be the complete set of all devices in the network, comprising only the management MACs of the devices in the network.

For brevity, switches 3240-A, 3240-B, 3240-C, 3240-D, and 3240-E in the exemplary network of FIG. 32 are herein referenced as "A", "B", "C", "D", and "E", respectively. Selected switch ports are identified in FIG. 32 as A1, A2, B1, B2, C1, D1, E1, E2, and E3. Referring to AFT entries including switches only, the contents of the AFTs are as indicated below:

the AFT of A1 is empty;
the AFT of A2 contains the set {"B", "C", "D", "E"};
the AFT of B1 contains the set {"C", "D", "E"};
the AFT of B2 contains "A";

the AFT of C1 contains the set {"A", "B", "D", "E"};
the AFT of D1 contains the set {"A", "B", "C", "E"};
the AFT of E1 contains the set {"A", "B", "C"};
the AFT of E2 contains "D"; and the
AFT of E3 is empty.

The intersection of the AFT of port A1 and AFT of port B1 is empty and the union is the set {"C", "D", "E"}. The union set does not contain all the switches. Hence, it is concluded that port A1 is not directly connected to port B1.

The intersection of the AFT of port A2 and AFT of port B1 is the set {"C", "D", "E"}, and the union is the set {"B", "C", "D", "E"}. The union set does not contain all the switches. Hence, it is concluded that port A2 is not directly connected to port B1.

The intersection of the AFT of port A2 and AFT of port B2 is empty and the union is {"A", "B", "C", "D", "E"}. The union set contains all the switches. Hence, it is concluded that port A2 is directly connected to port B2.

Thus, a link from port A2 to port B2 is added to the network image as illustrated in FIG. 33.

After completion of detecting pattern-2, switch 3240-A directly connects to switch 3240-B through link 3502 and switch 3240-D directly connects to switch 3240-E through link 3504 to form network image 3500. Connections 3502 and 3504 may be revised when pattern-3 discovery is applied.

Figure 36:
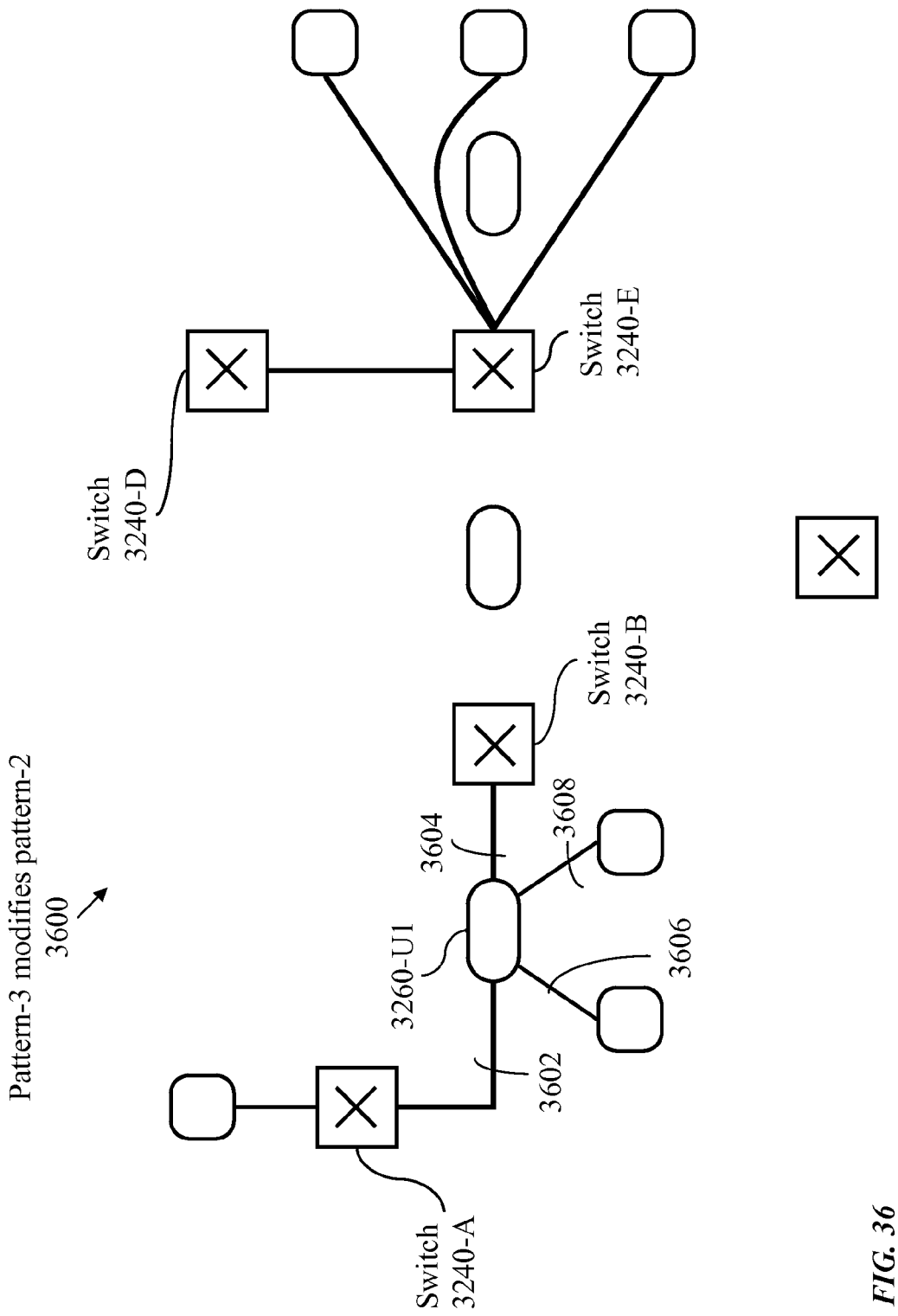
FIG. 36 illustrates network connectivity after incorporating a third connectivity pattern which refines the second connectivity pattern introduced in FIG. 35 in accordance with the topology-deduction process of FIG. 19.

FIG. 36 illustrates detection of pattern-3 in the network image of FIG. 35. Pattern-3 (2340, FIG. 23) relates to an unmanaged node connecting switches where the unmanaged node has subtending end devices. As described above, pattern-2 connectivity is based on AFT entries excluding end devices. Pattern-3 connectivity, however, is based on the full set of AFT entries, including end-device MAC addresses. The intersection of AFT entries for each link discovered according to pattern-2 is determined and if common entries correspond to end devices, an unmanaged node (hub or unmanaged switch) is inserted between the two switches with the common entries subtending from the inserted unmanaged node.

Completion of detecting pattern-3 results in network image 3600. Link 3502 (FIG. 35) is removed. Switch 3240-A and switch 3240-B connect to unmanaged node 3260-U1 through links 3502 and 3604, respectively. End hosts 3220-H2 and 3220-H3 connect to switches 3240-A and 3240-B through links 3606 and 3608. Switch 3240-D remains directly connected to switch 3240-E through link 3504.

Figure 37:
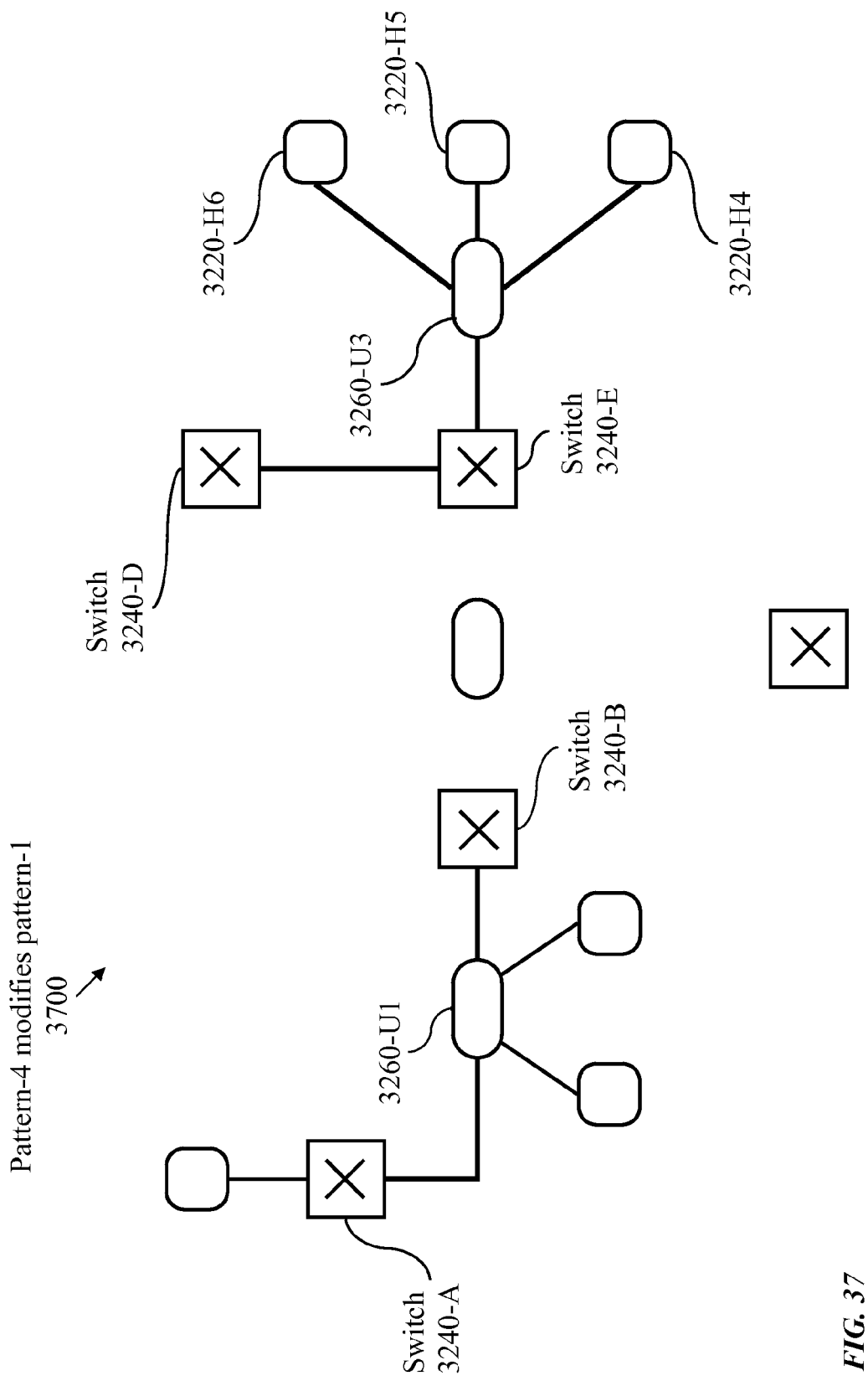
FIG. 37 illustrates network connectivity after incorporating a fourth connectivity pattern which refines the first connectivity pattern introduced in FIG. 30 in accordance with the topology-deduction process of FIG. 19.

FIG. 37 illustrates detection of pattern-4 in the network image of FIG. 36. Pattern 4 (2350, FIG. 23) relates to detection of unmanaged nodes connecting edge devices. If pattern-1 connections indicate that multiple end devices connect to a common port on a particular switch, it is concluded that an unmanaged node connects the multiple end devices to the common node.

Completion of pattern-4 detection yields network image 3700. Connections 3402, 3406, and 3408 are removed. End devices 3220-H4, 3220-H5, and 3220-H6 connect to switch 3240-E through unmanaged node 3260-U3. End device 3320-H1 remains directly connects to switch 3240-A (connection 3402, FIG. 34).

Connectivity Pattern 5

Figure 38:
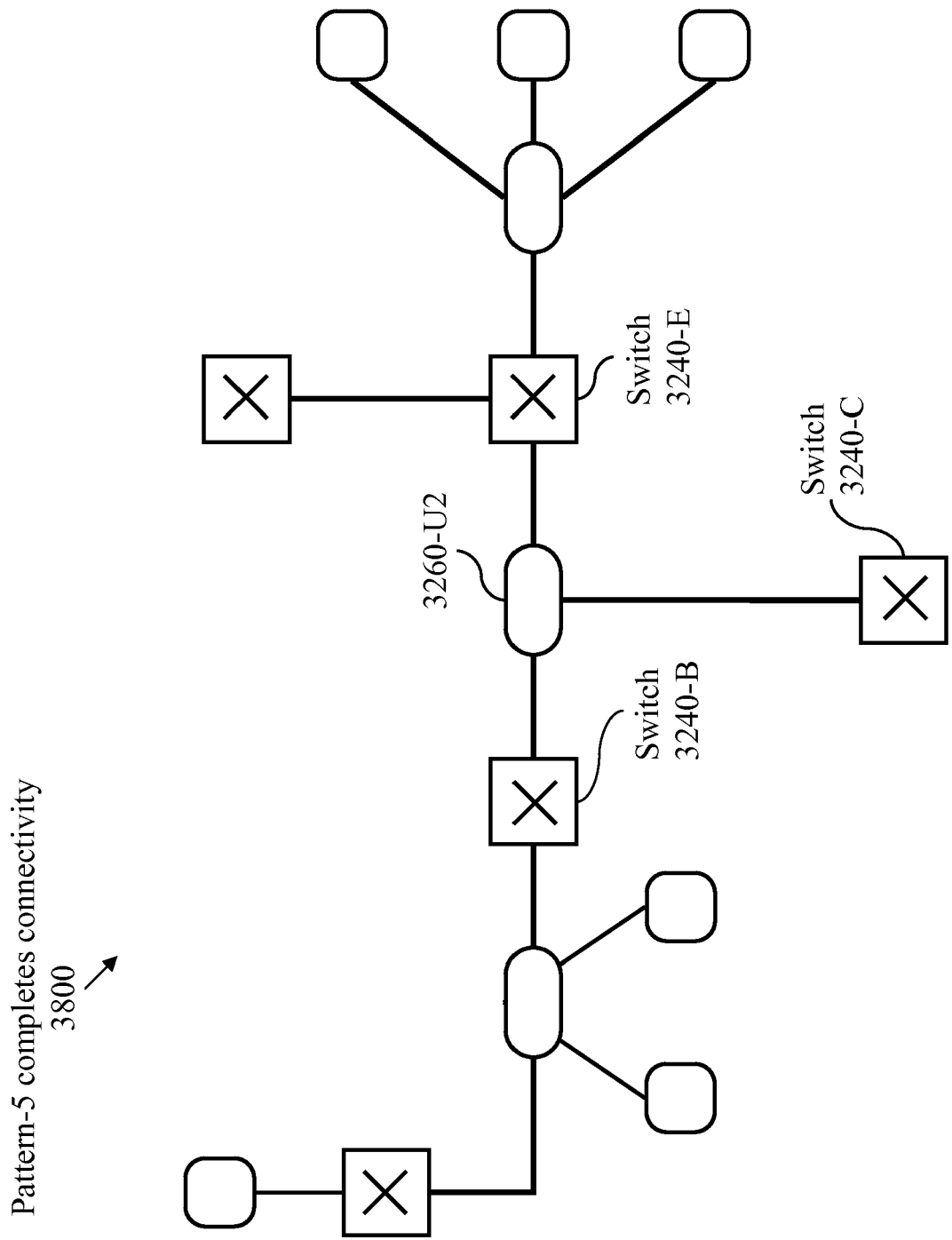
FIG. 38 illustrates network connectivity after incorporating a fifth connectivity pattern in accordance with the topology-deduction process of FIG. 21.

Pattern 5 (2420, FIG. 24) represents an unmanaged node connecting multiple switches. FIG. 38 illustrates network image 3800 after incorporating pattern 5. Unmanaged node 3260-U2 interconnects switches 3240-B, 3240-C, and 3240-E.

Connectivity Pattern 6

Pattern 3 represents unmanaged nodes between switches with only end devices connected to the unmanaged nodes. Pattern 4 represents unmanaged nodes which connect end devices to one switch. Pattern 5 represents an unmanaged node between switches with only one such instance in the network. Pattern 6 represents a generic case where unmanaged nodes can be anywhere in a network with multiple unmanaged nodes, with each unmanaged node connecting more than two switches.

Figure 39:
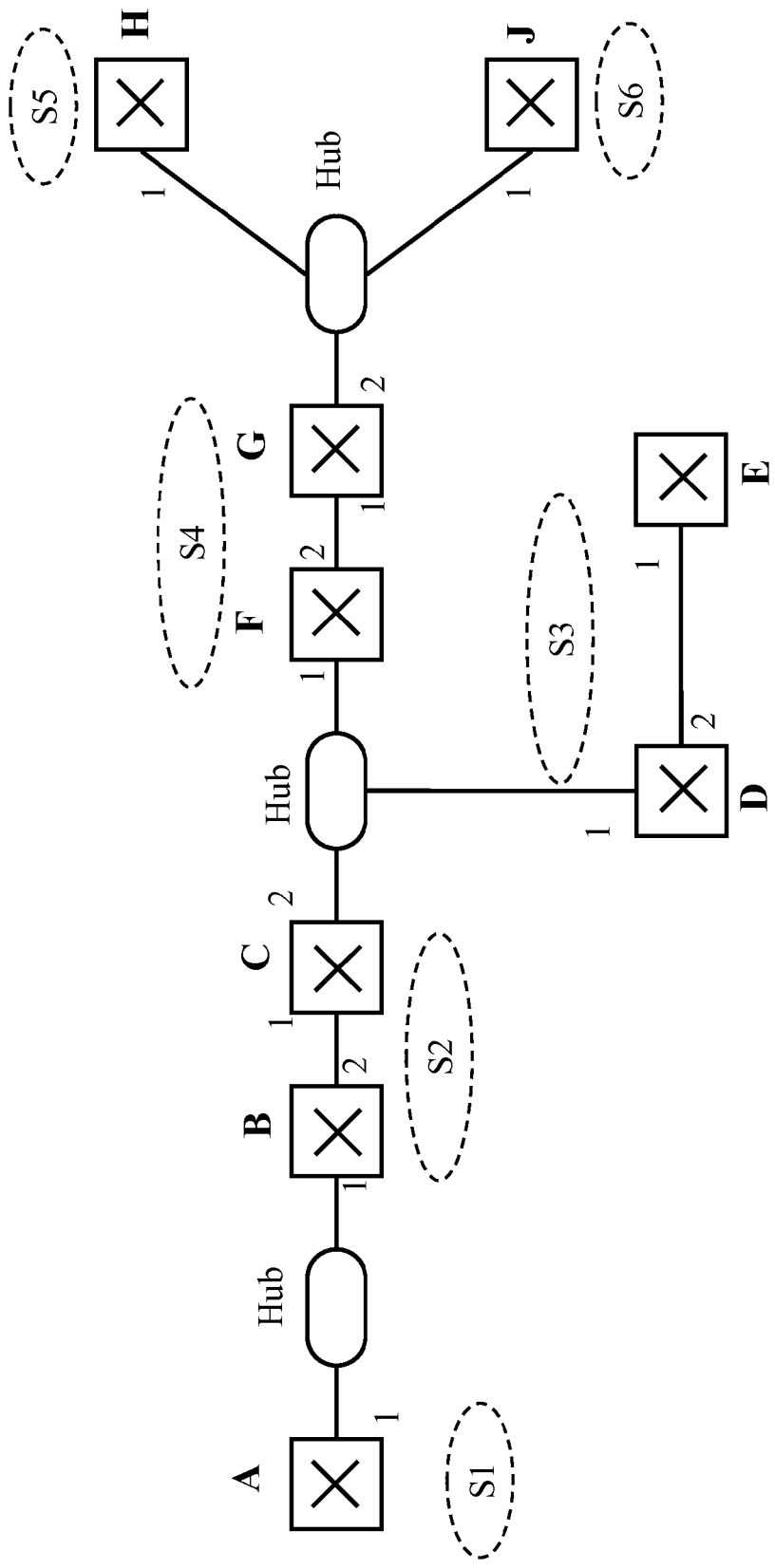
FIG. 39 illustrates an exemplary network for use in illustrating a method of connectivity-pattern discovery in accordance with an embodiment of the present invention.

A method of recognizing pattern 6 is described using the exemplary network of FIG. 39.The method comprises the steps below.
1. Incorporate pattern 2.
2. Incorporate pattern 1.
3. Six network portions are now formed. Each portion (set) of the network can be considered as a virtual switch—S1, S2, S3, S4, S5, S6.
4. Determine the leaf virtual switches. The leaf virtual switches are S1, S5, S6, and S3. Each of virtual switches S1, S5, S6, and S3 has a single port that is not connected. Neither of virtual switches S2 and S4 is considered a "leaf" because are not yet connected.
5. For each unconnected port, with switch management MAC addresses in its AFT, in the non-leaf virtual switches, determine Txy, where X identifies a switch and Y identifies a port. T is the combined set of AFTs for all other ports, other than port Y, on the switch. This will be done for ports B1, C2, F1 and G2; there are only 4 sets of T to consider.
6. Determine the non-leaf virtual switches that are closest to each leaf using a scheme based on subsets of T. Thus, for each T, determine if it is a subset of all other computed Ts from step 6. In the above example:
    a. T(S2→B1)—not a subset of any other T
    b. T(S2→C2)—is a subset of T(S4→G2);
    c. T(S4→F1)—is a subset of T(S2→B1)
    d. T(S4→G2)—not a subset of any other T
7. Thus, only T(S2→B1) and T(S4→G2) are not subsets of anything. Thus, they are at the edge of the network connected to one of the leaf virtual switches AND they are pointing outwards towards the edge of the network and not inwards towards the core of the network.
8. Try to match the leaf switches with the 2 ports identified in the previous step. For each leaf switch determine if its MAC address appears in the AFT of any of the above 2 ports. If so, make a connection. Determine which MAC address is found in the FDB of B1 and G2. This way S1 can be connected to S2 and S5/S6 connected to S4—a hub.
9. The next step is to re-label the virtual switches and repeat the entire exercise iteratively. This time there will be only 3 virtual switches . . . S1-S2, S3, S4-S5-S6. The iteration stops when there are no more unconnected switch ports—or if there is no change in connectivity during the last iteration.

Data Refinement and Validation

The data acquisition and validation module 330 (FIG. 3) examines received data to ensure correctness (step 450, FIG. 4). Each entry of the AFT retrieved from the switches/routers needs to be validated. The data acquisition and validation module 330 (FIG. 3) parses each entry to check if it contains a valid port number in "ifindex" field or a valid MAC address in hex format. Loopback entries from the ARP table are discarded.

Retaining Learnt MAC Addresses Only

Some special entries need to be removed, as some switches may include their own MAC address into their FDB table. Some switches also add generic addresses such as 00 00 00 00

00 00 or FF FF FF FF FF FF. These can be validated by checking the "dot1dTpFdbStatus" field. Only learnt addresses are retained.

Updating Network Inventory List

Devices that do not reply quickly enough to ping requests are not included in the inventory. Devices may also be missing from the inventory due to security measures taken to block ping packets. The ARP tables retrieved from the switches are parsed to check if there exists any entry, which has not been discovered by the initial ping process. If so, those entries corresponding to devices in the discovered subnet are added to the network inventory list.

Handling of Multiple IP to MAC Mapping

The process handles networks with virtual interfaces and aliasing. i.e., when more than one IP address is assigned for an interface but a single MAC address is used for the interface. Multiple IP addresses that map to a single MAC address of a system are detected. This relies on the fact that the ARP table stores all mappings and returns the first match that it finds for a requested item.

Reclassifying Switches

If a device, initially classified as a switch contains no AFT data, then, it is assumed that the device was incorrectly identified as a switch. The device is then re-classified to be an end system.

Removing Non-Management MACs from AFT

Each managed switch has a management IP address and corresponding management MAC address, which uniquely identifies it on a network. Network administrators connect to the switch using the management IP address. In addition to a management MAC, each port of a switch has a unique MAC address. Such a MAC address, which belongs to a specific interface is an example of a non-management MAC and is called an interface MAC address.

The address forwarding table (AFT) entries of each device are indexed on a per-port basis. The raw list of AFT entries can contain data with management MACs of other switches, non-management MACs of other switches and host MACs.

Non-management MAC addresses for each port are removed from the list, because only management MAC addresses for the topology discovery process are needed. Management MAC addresses are identified as MAC addresses present in the ARP table.

Consider two switches labeled as switch "A" and switch "B". The management MAC of switch "A" is "aa aa aa aa aa aa" and the management MAC of switch "B" is "bb bb bb bb bb bb".

Switch "A" has 4 ports, and the interface MACs on the ports are "aa aa aa aa aa ii", "aa aa aa aa aa jj", "aa aa aa aa aa kk", and "aa aa aa aa aa ll" and switch "B" has 4 ports with interface MACs of "bb bb bb bb bb pp", "bb bb bb bb bb qq", "bb bb bb bb bb rr", and "bb bb bb bb bb ss. A port ("aa aa aa aa aa kk") of switch "A" connects to a port ("bb bb bb bb bb qq") of switch "B".

When the address forwarding tables are populated, switch "A" will have the following information in its table.

After execution of the data refinement process described above, only the first two entries from the table are retained based on the FDB status (Do1dTpFdbStatus). The process removes the second entry from the table, which corresponds to the interface MAC of switch "B", and hence the table will only contain the first entry, which is a management MAC of switch "B".

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A network appliance for topology discovery of a network comprising a plurality of heterogeneous devices, each device having at least one port, the network appliance comprising:
 a processor; and
 a computer readable medium storing processor-executable instructions organized into:
  a data acquisition and validation module for data collection from said plurality of heterogeneous devices and validating received data to ensure correctness and completeness;
  a device identification and classification module for:
   identifying active devices among said plurality of heterogeneous devices and producing a set of identified devices; and
   classifying each said identified device according to values of device descriptors acquired from said set of identified devices, said device descriptors being selected from a specified set of device descriptors; and
  a topology deduction module for synthesizing a network-topology image according to:
   classifications of said set of identified devices;
   address-forwarding data acquired from each port of each device among said set of identified devices; and
   a set of encoded connectivity patterns, each connectivity pattern defined by devices of specific device types and respective media-access data.

2. The network appliance of claim 1, further comprising a network interface module having stored thereon processor-readable instructions to cause said processor to:
 communicate with said plurality of heterogeneous devices through a shared network;
 format data sent to said heterogeneous devices; and
 interpret data received from said heterogeneous devices.

3. The network appliance of claim 1, further comprising one of:
 a direct connection to a selected device from among said plurality of heterogeneous devices; and
 remote access to said heterogeneous devices.

4. The network appliance of claim 1, further comprising processor-readable instructions within said device identification and classification module to cause said processor to:
 communicate with devices having IP addresses within a specified IP address range to identify responsive devices;
 form a set of IP addresses of responsive devices; and
 communicate with each responsive device to obtain values of said device descriptors.

5. The network appliance of claim 1, further comprising processor-readable instructions within said topology deduction module to cause said processor to:
 sort said encoded connectivity patterns according to topological dependency;
 initialize said network-topology image to comprise unconnected devices of said set of identified devices;
 identify all occurrences of said each connectivity pattern; and
 incorporate said all occurrences in said network-topology image.

6. The network appliance of claim 1, further comprising processor-readable instructions within said topology deduction module to cause said processor to:
- select a target switch among said plurality of heterogeneous devices;
- select a port in said target switch;
- acquire an address forwarding table for said port;
- where said address forwarding table includes multiple entries, all corresponding to end devices among said set of identified devices, insert an unmanaged node connecting said end devices to said port in said network-topology image.

7. The network appliance of claim 1, further comprising processor-readable instructions within said topology deduction module to cause said processor to:
- identify a first switch among said plurality of heterogeneous devices;
- identify a second switch among said plurality of heterogeneous devices;
- select a port pair, a first port from among ports of said first switch and a second port from among ports of said second switch;
- acquire a first address-forwarding table of said first port and a second address-forwarding table of said second port;
- where said first address forwarding table and said second address forwarding table are non-intersecting and have a complete union, a complete union occupying an entire address space, ascertain direct connectivity between said first switch and said second switch;
- where said first address forwarding table and said second address forwarding table have a complete union and common end devices, insert an unmanaged node connecting said end devices to said port pair in said network-topology image.

8. The network appliance of claim 1 wherein said device descriptors determine presence of at least one of:
- a simple-network-management-protocol agent;
- IP-switching capability;
- characterization of a device as one of:
  - an end device with an SNMP agent;
  - a layer-2 switch;
  - a router; and
  - a layer-3 switch;
- management information base; and
- forwarding media-access-control addresses.

9. The network appliance of claim 1 wherein:
- at least one descriptor is a root descriptor having has at least one successor descriptor and no preceding descriptors; and
- a value of a descriptor indicates one of:
  - a device type from among a set of predefined device types; and
  - a successor descriptor.

10. The network appliance of claim 1 wherein said connectivity patterns are arranged into multiple strata, wherein connectivity patterns of each stratum are independent from each other and from connectivity patterns of any succeeding stratum.

11. The network appliance of claim 1 wherein said set of connectivity patterns comprise:
- end devices directly connected to a switch;
- directly connected switches;
- an unmanaged node connecting switches and having subtending end devices;
- unmanaged nodes connecting edge devices;
- an unmanaged node connecting multiple switches; and
- unmanaged nodes with each unmanaged node connecting more than two switches.

12. A method of topology discovery of a network comprising a plurality of heterogeneous devices, the method, implemented by a network appliance having a processor, comprising:
- collecting data from said plurality of heterogeneous devices;
- validating received data to ensure correctness and completeness;
- identifying active devices among said plurality of heterogeneous devices to produce a set of identified devices; and
- classifying each said identified device according to values of device descriptors acquired from said set of identified devices to produce classifications of said set of identified devices, said device descriptors being selected from a specified set of device descriptors; and
- synthesizing a network-topology image according to:
  - classifications of said set of identified devices;
  - address-forwarding data acquired from each device among said set of identified devices; and
  - a set of encoded connectivity patterns, each connectivity pattern defined by devices of specific device types and respective media-access data.

13. The method of claim 12 further comprising:
- communicating with said plurality of heterogeneous devices through a shared network;
- formatting data sent to said heterogeneous devices; and
- interpreting data received from said heterogeneous devices.

14. The method of claim 12 further comprising directly connecting said network appliance to a selected device from among said plurality of heterogeneous devices.

15. The method of claim 12 further comprising:
- communicating with devices having IP addresses within a specified IP address range to identify responsive devices;
- forming a set of IP addresses of responsive devices; and
- communicating with each responsive device to obtain values of said device descriptors.

16. The method of claim 12 further comprising:
- sorting said encoded connectivity patterns according to topological dependency;
- initializing said network-topology image to comprise unconnected devices of said set of identified devices;
- identifying all occurrences of said each connectivity pattern; and
- incorporating said all occurrences in said network-topology image.

17. The method of claim 12 further comprising:
- selecting a target device among said plurality of heterogeneous devices;
- selecting a port in said target device;
- acquiring an address forwarding table for said port;
- where said address forwarding table includes multiple entries, all corresponding to end devices among said set of identified devices, inserting in said network-topology image an unmanaged node connecting said end devices to said port.

18. The method of claim 12 further comprising:
- identifying a first switch among said plurality of heterogeneous devices;
- identifying a second switch among said plurality of heterogeneous devices;

selecting a port pair, a first port from among ports of said first switch and a second port from among ports of said second switch;

acquiring a first address-forwarding table of said first port and a second address-forwarding table of said second port;

ascertaining direct connectivity between said first switch and said second switch subject to a determination that said first address forwarding table and said second address forwarding table are non-intersecting and have a complete union, where a complete union occupies an entire address space; and inserting in said network-topology image an unmanaged node connecting said end devices to said port pair subject to a determination that said first address forwarding table and said second address forwarding table have a complete union and common end devices.

19. The method of claim 12 further comprising interpreting said device descriptors as an indication of presence of at least one of:
   a simple-network-management-protocol agent;
   IP-switching capability;
   characterization of a device as one of:
      an end device with an SNMP agent;
      a layer-2 switch;
      a router; and
      a layer-3 switch;
   management information base; and
   forwarding media-access-control addresses.

20. The network appliance of claim 12 further comprising arranging said connectivity patterns into multiple strata, wherein connectivity patterns of each stratum are independent from each other and from connectivity patterns of any succeeding stratum.

* * * * *